US011565456B2

United States Patent
Oike et al.

(10) Patent No.: US 11,565,456 B2
(45) Date of Patent: Jan. 31, 2023

(54) BLOW MOLDING DEVICE, BLOW MOLDING METHOD, AND MOLD UNIT

(71) Applicant: NISSEI ASB MACHINE CO., LTD., Nagano (JP)

(72) Inventors: Toshiteru Oike, Nagano (JP); Daizaburo Takehana, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

(21) Appl. No.: 17/417,481

(22) PCT Filed: Dec. 26, 2019

(86) PCT No.: PCT/JP2019/051132
§ 371 (c)(1),
(2) Date: Jun. 23, 2021

(87) PCT Pub. No.: WO2020/138292
PCT Pub. Date: Jul. 2, 2020

(65) Prior Publication Data
US 2022/0055279 A1    Feb. 24, 2022

(30) Foreign Application Priority Data

Dec. 28, 2018 (JP) .............................. JP2018-247642
Dec. 28, 2018 (JP) .............................. JP2018-247651
Dec. 28, 2018 (JP) .............................. JP2018-247661

(51) Int. Cl.
*B29C 49/64* (2006.01)
*B29C 49/48* (2006.01)
*B29C 49/06* (2006.01)
*B29C 49/36* (2006.01)
(Continued)

(52) U.S. Cl.
CPC .............. *B29C 49/48* (2013.01); *B29C 49/06* (2013.01); *B29C 49/36* (2013.01); *B29C 49/64* (2013.01); *B29K 2067/003* (2013.01); *B29L 2031/712* (2013.01)

(58) Field of Classification Search
CPC ......... B29C 49/06; B29C 49/28; B29C 49/36; B29C 49/64; B29C 49/6427
See application file for complete search history.

(56) References Cited

U.S. PATENT DOCUMENTS 9,415,531 B2    8/2016  Aktas
2014/0131920 A1  5/2014  Nakahara
(Continued)

FOREIGN PATENT DOCUMENTS

FR    3 004 985 A1    10/2014
JP    52-082967 A      7/1977
(Continued)

OTHER PUBLICATIONS

International Search Report issued in International Patent Application No. PCT/JP2019/051132, dated Mar. 31, 2020, along with English translation thereof.
(Continued)

*Primary Examiner* — Robert B Davis
(74) *Attorney, Agent, or Firm* — Greenblum & Bernstein, P.L.C.

(57) ABSTRACT

An object of the present invention is to provide a blow molding device, a blow molding method, a mold unit, and a jig capable of shortening a molding cycle time. There is provided a blow molding device (100), in which the blow molding device (100) includes an injection molding part (10) injection-molding a preform (1) having a neck portion (3) on an open side and a main body portion (2) on a closed side, a temperature adjustment part (20, 520) adjusting a temperature of the preform (1) molded by the injection molding part (10), and a blow molding part (30) blow-molding the preform (1) whose temperature has been adjusted by the temperature adjustment part (20, 520), and the temperature adjustment part (20, 520) include a conditioning core mold (21, 321, 421, 521) that is in contact with
(Continued)

substantially an entire inner surface of the main body portion (2) and a conditioning cavity mold (22, 322, 422, 522) that is in contact with substantially an entire outer surface of the main body portion (2), and compress and deform the main body portion (2) of the preform (1) into a desired shape with the main body portion (2) sandwiched between the conditioning core mold (21, 321, 421, 521) and the conditioning cavity mold (22, 322, 422, 522).

12 Claims, 15 Drawing Sheets

(51) Int. Cl.
  *B29K 67/00* (2006.01)
  *B29L 31/00* (2006.01)

(56) References Cited

U.S. PATENT DOCUMENTS

2014/0271963 A1* 9/2014 Keir .................... B29C 45/7207 425/143
2020/0406526 A1 12/2020 Horigome et al.

FOREIGN PATENT DOCUMENTS

| | | | |
|---|---|---|---|
| JP | 63-092416 A | 4/1988 | |
| JP | 05-185493 A | 7/1993 | |
| JP | 2013-017391 A | 1/2013 | |
| JP | 2013-107391 A | 6/2013 | |
| JP | 2016-078400 A | 5/2016 | |
| JP | 2016-199053 A | 12/2016 | |
| TW | 527275 B * | 4/2003 | ......... B29C 49/6409 |
| WO | 2013/012067 A1 | 1/2013 | |
| WO | 2017/098673 A1 | 6/2017 | |

OTHER PUBLICATIONS

Written Opinion of the International Searching Authority issued in International Patent Application No. PCT/JP2019/051132, dated Mar. 31, 2020, along with English translation thereof.
Notification of Reasons for Refusal (Office Action) in Japanese Counterpart Patent Appl. No. 2020-542457, dated Sep. 3, 2020, along with an English translation thereof.
Partial Supplementary European Search Report issued in European Patent Application No. 19903430.7 dated Aug. 12, 2022.

* cited by examiner

FIG. 10A
FIG. 10B
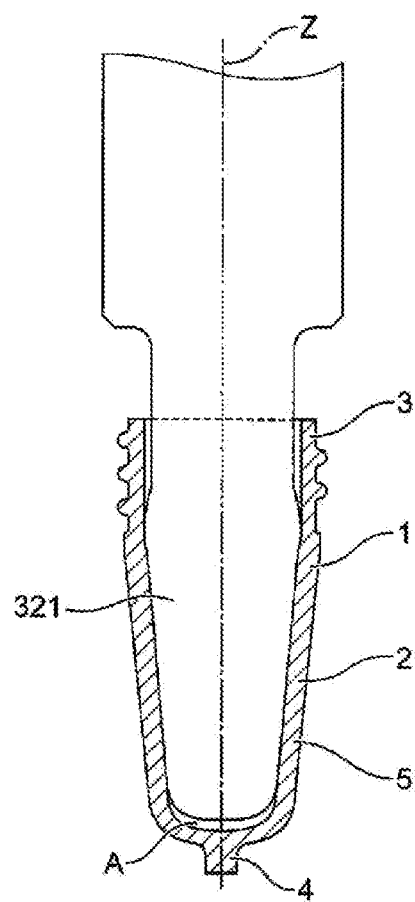
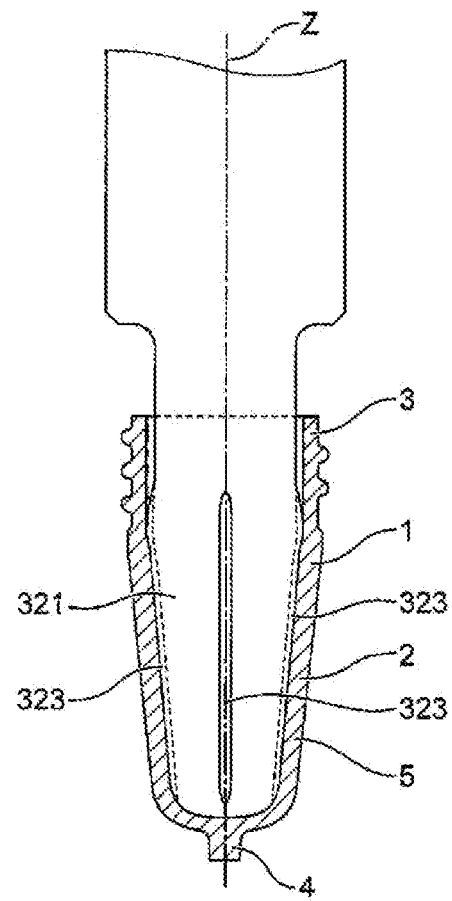

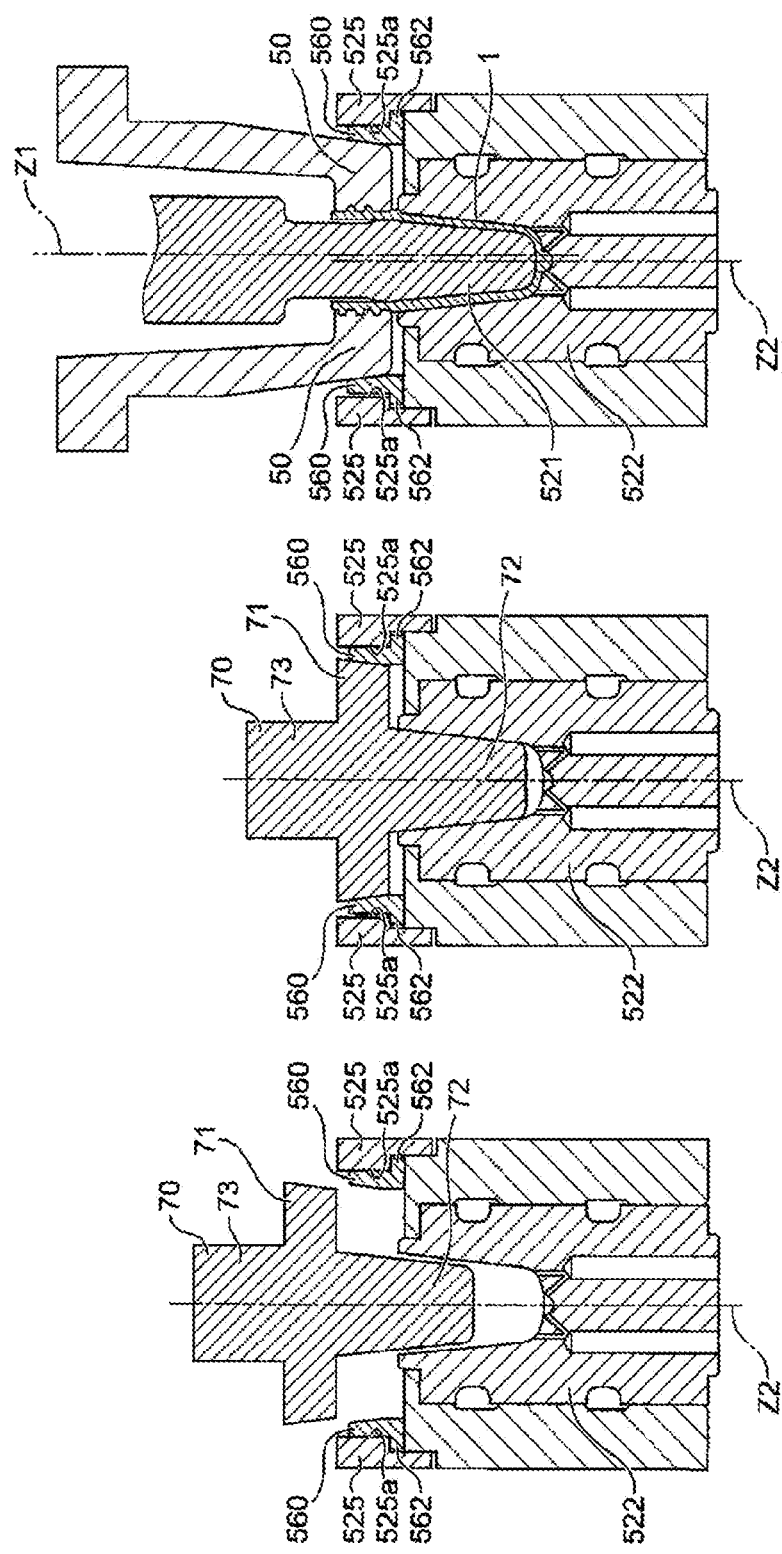

BLOW MOLDING DEVICE, BLOW MOLDING METHOD, AND MOLD UNIT

BACKGROUND OF THE INVENTION

Field of the Invention

The present invention relates to a hot parison type blow molding device and a blow molding method. Specifically, the present invention relates to a blow molding device, a blow molding method, and a mold unit that can perform an appropriate temperature adjustment process in a short time even for a preform that has a short injection molding time and is released in a high temperature state.

DESCRIPTION OF THE RELATED ART

Conventionally, a blow molding device including an injection molding part that injects a preform, a temperature adjustment part that adjusts a temperature of the preform molded by the injection molding part, and a blow molding part that blow-molds the preform that has been temperature-adjusted by the temperature adjustment part has been known (see, for example, JP 52-082967 A). This type of blow molding device is a type in which the temperature adjustment part is added to the conventional blow molding device (see, for example, WO No 2017/098673 A) that mainly includes only an injection molding part and a blow molding part. The preform that has just been molded by the injection molding part generally does not have a temperature distribution suitable for the blow molding. Therefore, the temperature adjustment part that enables positive (forced) temperature adjustment (air cooling and heat treatment) of the preform is provided between the injection molding part and the blow molding part to make it possible to efficiently adjust the preform to a temperature suitable for the blow molding. In addition, since it takes a long time to sufficiently cool the preform in the injection molding part, a special temperature adjustment part that enables positive cooling processing using cooling air in the temperature adjustment part has also been devised (see, for example, JP 05-185493).

In addition, as an example of the special temperature adjustment part, by an outer peripheral surface of a bottom portion of a preform and a lower portion of a body portion that is continuous with the bottom portion of the preform is mechanically adhered with a cooling pot to ensure cooling and by raising the temperature of the body portion excluding the lower portion of the body portion that is continuous with the bottom portion to a predetermined temperature by a heating block, a blow molding device for manufacturing a thick container having a bottom portion having a desired thickness and a body portion having a uniformly and thinly stretched wall portion when performing the blow molding has been proposed (for example, see WO No. 2013/012067).

However, in the temperature adjustment part of the blow molding device according to the above-described conventional technique, when the temperature of the preform having the thick wall portion is adjusted, even if the temperature of the front and back walls of the wall portion can be adjusted in a short time, it is difficult to adjust a temperature in a short time at the center of the thick wall, that is, at the position away from both wall surfaces. Therefore, only the container having the body portion formed of the thinly stretched wall portion could be manufactured in a short time.

In addition, when the injection-molded cooling time is short, it is not possible to sufficiently remove the temperature deviation and equalize the temperature of the preform in the temperature adjustment part, and in addition, when the material is a crystalline resin (for example, polyethylene terephthalate (PET)), whitening and clouding due to slow cooling are likely to occur, making it difficult to manufacture high-quality containers.

Furthermore, when inserting the conditioning core mold of the temperature adjustment part into the conditioning cavity mold, as illustrated in FIG. 15A, there is a risk that air A will be trapped between the preform 301 and the conditioning core mold 321. In order to solve this problem, it is conceivable to form a slit 323 for allowing air to escape in the conditioning core mold 321 as illustrated in FIG. 15B. However, according to the configuration, although air can be escaped so as not to be trapped, there is a risk that the trace of the slit 323 is left on the inner surface of the preform 301, and the trace of the slit 323 remains thinly on the blow-molded container, and the quality such as the physical properties and appearance of the molded container is deteriorated.

Furthermore, when the temperature distribution of the preform is biased, the wall thickness of the blow-molded container may not be uniform, so there is a risk that the quality such as the physical properties and appearance of the molded container may be deteriorated.

SUMMARY OF THE INVENTION

There is provided a blow molding device (100), in which the blow molding device (100) includes an injection molding part (10) injection-molding a preform (1) having a neck portion (3) on an open side and a main body portion (2) on a closed side, a temperature adjustment part (20, 520) adjusting a temperature of the preform (1) molded by the injection molding part (10), and a blow molding part (30) blow-molding the preform (1) whose temperature has been adjusted by the temperature adjustment part (20, 520), and the temperature adjustment part (20, 520) include a conditioning core mold (21, 321, 421, 521) that is in contact with substantially an entire inner surface of the main body portion (2) and a conditioning cavity mold (22, 322, 422, 522) that is in contact with substantially an entire outer surface of the main body portion (2), and compress and deform the main body portion (2) of the preform (1) into a desired shape with the main body portion (2) sandwiched between the conditioning core mold (21, 321, 421, 521) and the conditioning cavity mold (22, 322, 422, 522).

There is provided a blow molding method using a blow molding device (100), in which the blow molding device (100) includes an injection molding part (10) injection-molding a preform (1) having a neck portion (3) on an open side and a main body portion (2) on a closed side, a temperature adjustment part (20, 520) adjusting a temperature of the preform (1) molded by the injection molding part (10), and a blow molding part (30) blow-molding the preform (1) whose temperature has been adjusted by the temperature adjustment part (20, 520), and the temperature adjustment part (20, 520) include a conditioning core mold (21, 321, 421, 521) that is in contact with substantially an entire inner surface of the main body portion (2) and a conditioning cavity mold (22, 322, 422, 522) that is in contact with substantially an entire outer surface of the main body portion (2), and compress and deform the main body portion (2) of the preform (1) into a desired shape with the main body portion (2) sandwiched between the conditioning core mold (21, 321, 421, 521) and the conditioning cavity mold (22, 322, 422, 522), the blow molding method including: disposing the preform (1) in the conditioning cavity mold (22, 322, 422, 522); inserting the conditioning core mold (21, 321, 421, 521) into the preform (1); compressing and deforming the main body portion (2) of the preform (1) with the main body portion (2) sandwiched between the conditioning core mold (21, 321, 421, 521) and the conditioning cavity mold (22, 322, 422, 522); and transporting the compression-deformed preform (1) to the blow molding part (30) and blow-molding the preform (1).

There is provided a blow molding device (100), in which the blow molding device (100) includes an injection molding part (10) injection-molding a preform (1) having a neck portion (3) on an open side and a main body portion (2) on a closed side; a temperature adjustment part (20, 520) adjusting a temperature of the preform (1) molded by the injection molding part (10); and a blow molding part (30) blow-molding the preform (1) whose temperature has been adjusted by the temperature adjustment part (20, 520), the temperature adjustment part (20, 520) include a conditioning core mold (21, 321, 421, 521) that is in contact with an inner surface of the main body portion (2) of the preform (1) and a conditioning cavity mold (22, 322, 422, 522) that is in contact with an outer surface of the main body portion (2) of the preform (1), and when the conditioning core mold (21, 321, 421, 521) is located within the conditioning cavity mold (22, 322, 422, 522), the conditioning core mold (21, 321, 421, 521) is formed so that a gap from the conditioning cavity mold (22, 322, 422, 522) gradually increases as an interval from the tip portion (21a) of the conditioning core mold (21, 321, 421, 521) toward the base end portion (21b) increases.

There is provided a blow molding method using a blow molding device (100), in which the blow molding device (100) includes an injection molding part (10) injection-molding a preform (1) having a neck portion (3) on an open side and a main body portion (2) on a closed side; a temperature adjustment part (20, 520) adjusting a temperature of the preform (1) molded by the injection molding part (10); and a blow molding part (30) blow-molding the preform (1) whose temperature has been adjusted by the temperature adjustment part (20, 520), the temperature adjustment part (20, 520) include a conditioning core mold (21, 321, 421, 521) that is in contact with an inner surface of the main body portion (2) of the preform (1) and a conditioning cavity mold (22, 322, 422, 522) that is in contact with an outer surface of the main body portion (2) of the preform (1), and when the conditioning core mold (21, 321, 421, 521) is located within the conditioning cavity mold (22, 322, 422, 522), the conditioning core mold (21, 321, 421, 521) is formed so that a gap from the conditioning cavity mold (22, 322, 422, 522) gradually increases as an interval from the tip portion (21a) of the conditioning core mold (21, 321, 421, 21) toward the base end portion (21b) increases, the blow molding method including: disposing the preform (1) in the conditioning cavity mold (22, 322, 422, 522); inserting the conditioning core mold (21, 321, 421, 521) into the preform (1), and sequentially extruding air between the preform (1) and the conditioning cavity mold (22, 322, 422, 522) from a tip toward a base end of the conditioning core mold; modifying a shape of the main body portion (2) of the preform (1) with the main body portion (2) sandwiched between the conditioning core mold (21, 321, 421, 521) and the conditioning cavity mold (22, 322, 422, 522); and transporting the preform (1) whose shape is modified to the blow molding part (30) and blow-molding the preform (1).

There is provided mold unit (20, 520), which is a temperature adjustment part (20, 520) adjusting a temperature of a preform (1) having a neck portion (3) on an open side and a main body portion (2) on a closed side, molded by an injection molding part (10), the temperature adjustment part (20, 520) including: a conditioning core mold (21, 321, 421, 521) that is in contact with an inner surface of the main body portion (2) of the preform (1), and a conditioning cavity mold (22, 322, 422, 522) that is in contact with an outer surface of the main body portion (2), in which when the conditioning core mold (21, 321, 421, 521) is located within the conditioning cavity mold (22, 322, 422, 522), the conditioning core mold (21, 321, 421, 521) is formed so that a gap from the conditioning cavity mold (22, 322, 422, 522) gradually increases as an interval from the tip portion (21a) of the conditioning core mold (21, 321, 421, 521) toward the base end portion (21b) increases.

There is provided a blow molding device (100) including: an injection molding part (10) injection-molding a preform (1) having a neck portion (3) on an open side and a main body portion (2) on a closed side; a temperature adjustment part (20, 520) adjusting a temperature of the preform (1) molded by the injection molding part (10); and a blow molding part (40) blow-molding the main body portion (2) of the preform (1) whose temperature has been adjusted by the temperature adjustment part (20, 520), in which the temperature adjustment part (20, 520) include a conditioning core mold (21, 321, 421, 521) that is in contact with an inner surface of the main body portion (2) of the preform (1), and a conditioning cavity mold (22, 322, 422, 522) that is in contact with an outer surface of the main body portion (2), and at least one of the conditioning core mold (21, 321, 421, 521) and the conditioning cavity mold (22, 322, 422, 522) is provided so that axial centers of each other are moved and adjusted eccentrically.

There is provided mold unit (20, 520) adjusting a temperature of a preform (1) having a neck portion (3) on an open side and a main body portion (2) on a closed side, which is molded by an injection molding part (10), the mold unit (20, 520) including: a conditioning core mold (21, 321, 421, 521) that is in contact with an inner surface of the main body portion (2) of the preform (1), and a conditioning cavity mold (22, 322, 422, 522) that is in contact with an outer surface of the main body portion (2), in which one of the conditioning core mold (21, 321, 421, 521) and the conditioning cavity mold (22, 322, 422, 522) is provided so as to be eccentrically movable with respect to the other thereof.

BRIEF DESCRIPTION OF DRAWINGS

FIGS. 10A and 10B are cross-sectional views of a normal temperature adjustment part.

FIGS. 15A to 15C are cross-sectional views of positioning the axial center of the temperature adjustment part using a jig as viewed from the front.

DESCRIPTION OF EMBODIMENTS

Hereinafter, preferred embodiments of the present invention will be described with reference to the drawings.

First Embodiment

Figure 1:
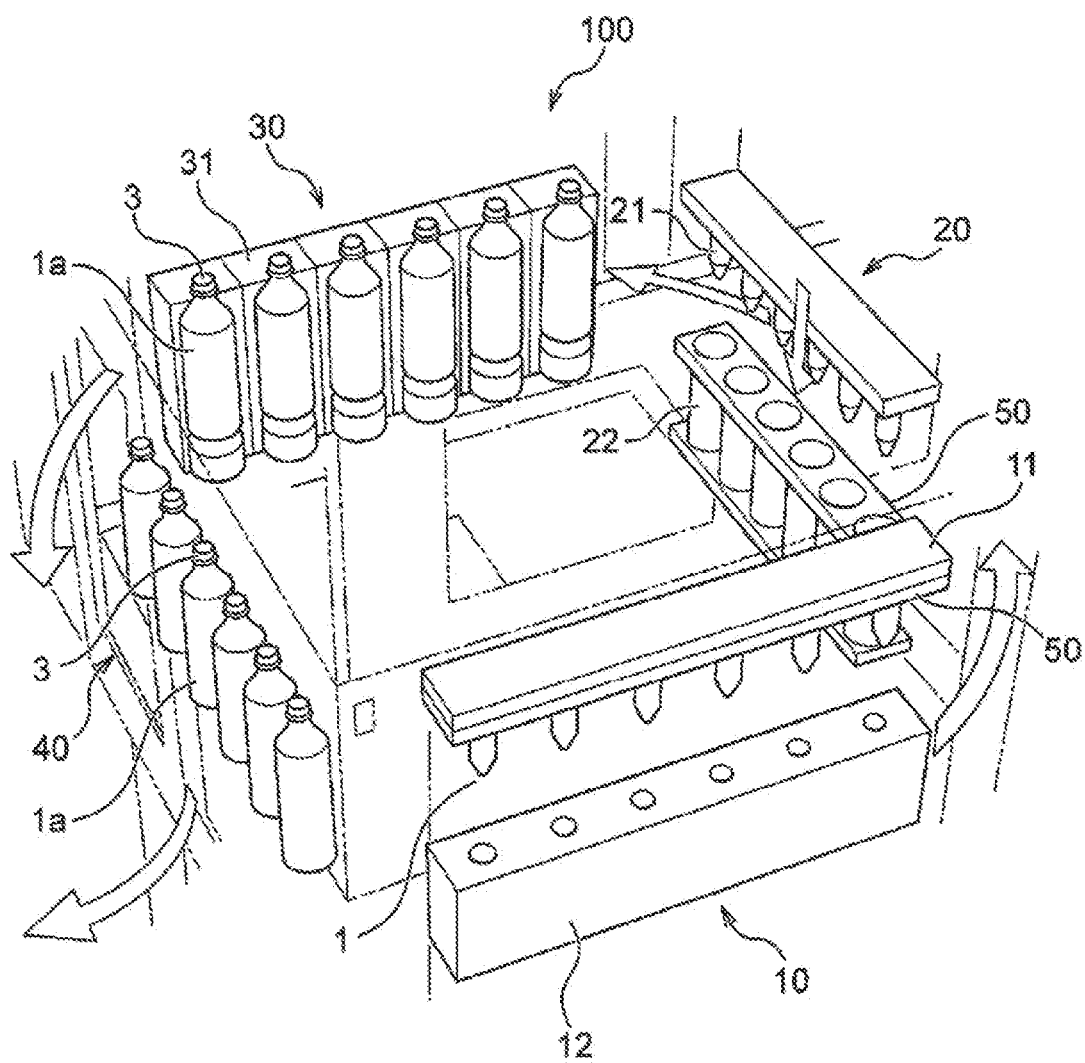
FIG. 1 is a perspective view of a blow molding device (including injection molding part, temperature adjustment part, blow molding part, and take-out part) according to an embodiment of the present invention.
Figure 2:
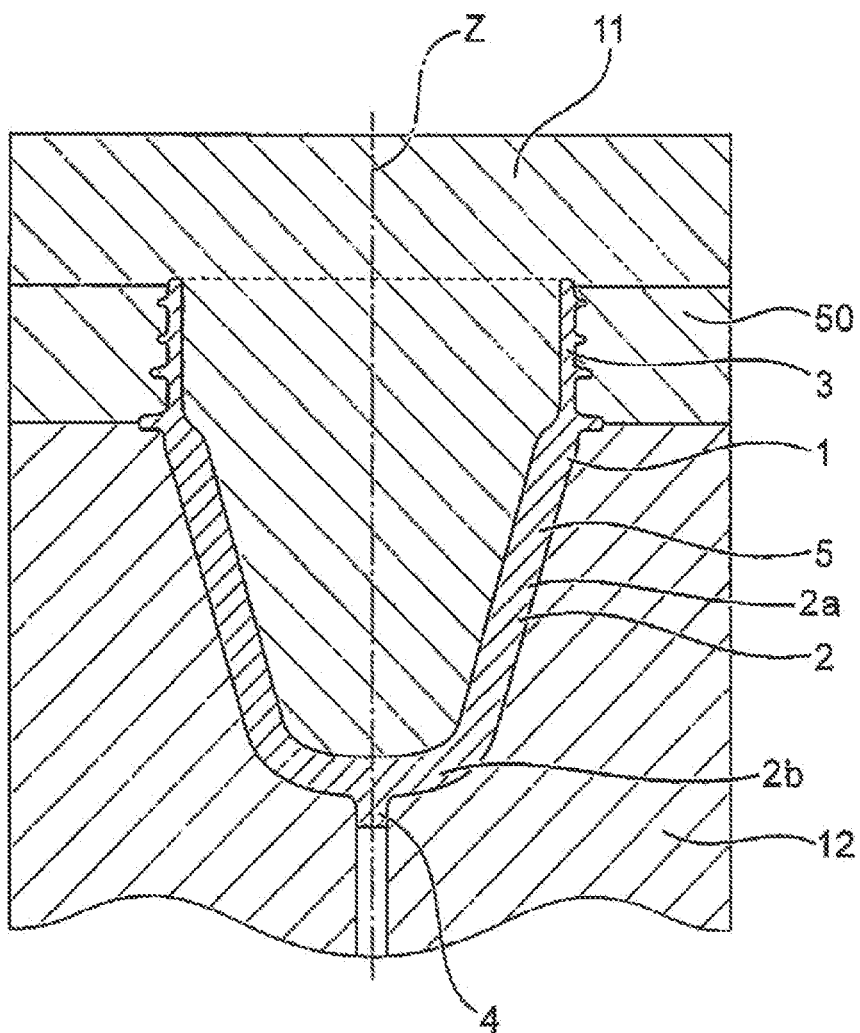
FIG. 2 is an enlarged cross-sectional view of a preform injection molded by the injection molding part as viewed from the front.
Figure 3:
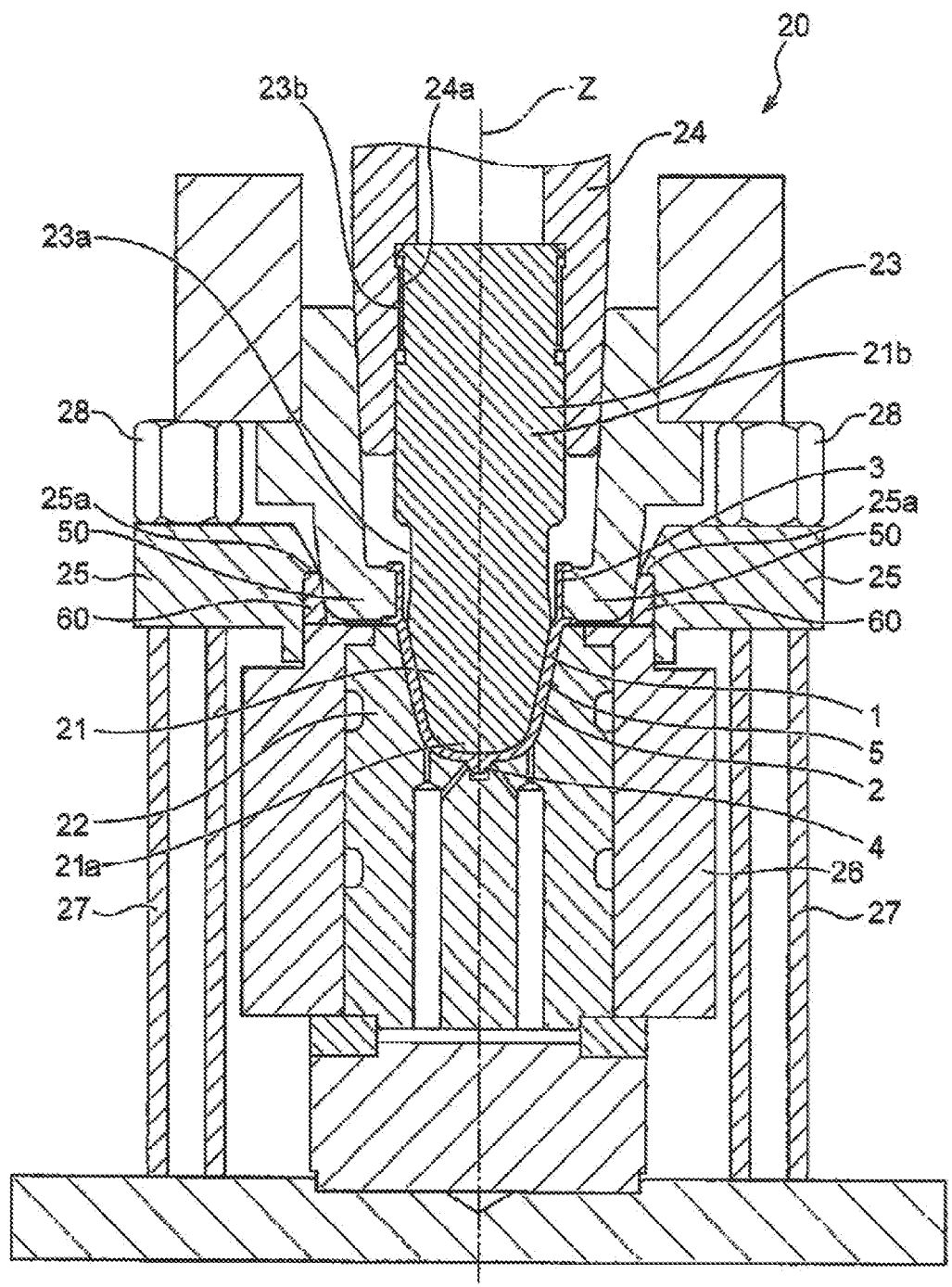
FIG. 3 is a cross-sectional view of the temperature adjustment part as viewed from the front.
Figure 4:
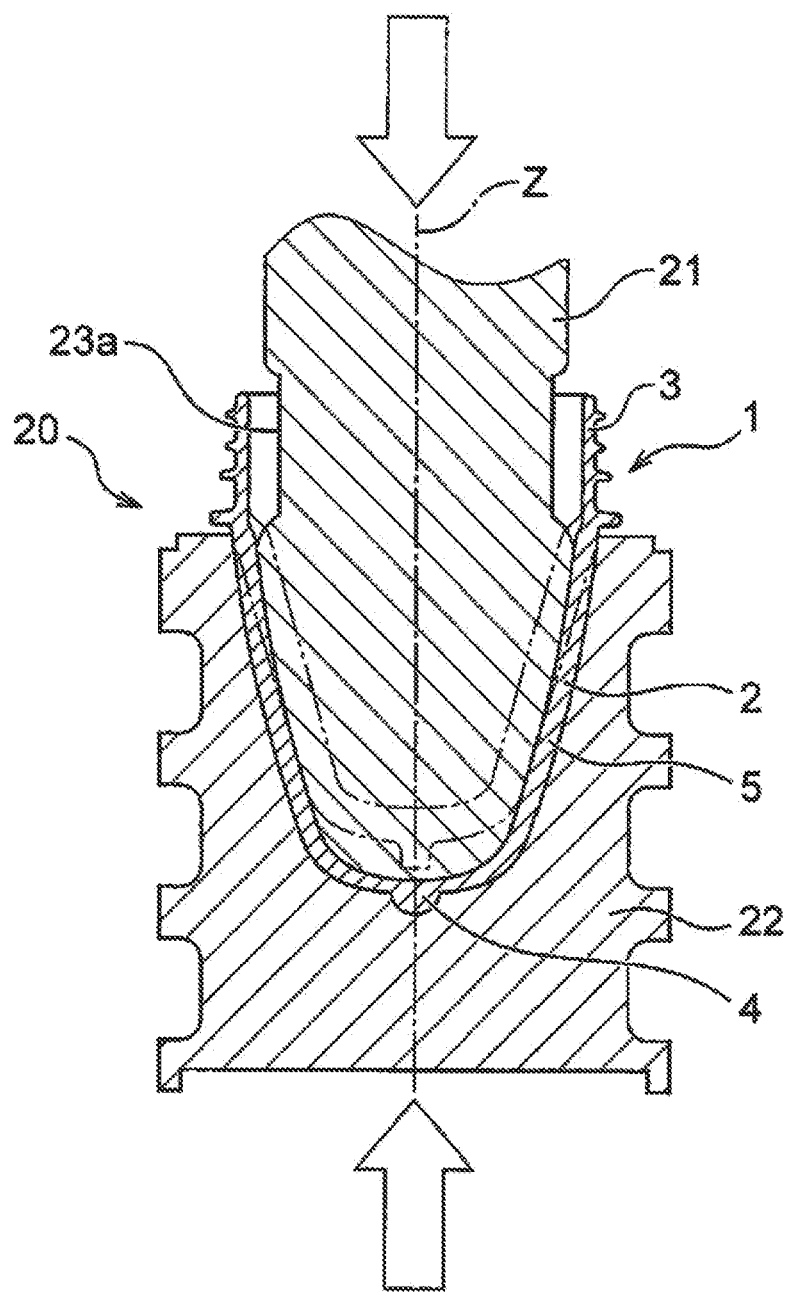
FIG. 4 is an enlarged cross-sectional view of the preform whose temperature has been adjusted by the temperature adjustment part as viewed from the front.
Figure 5:
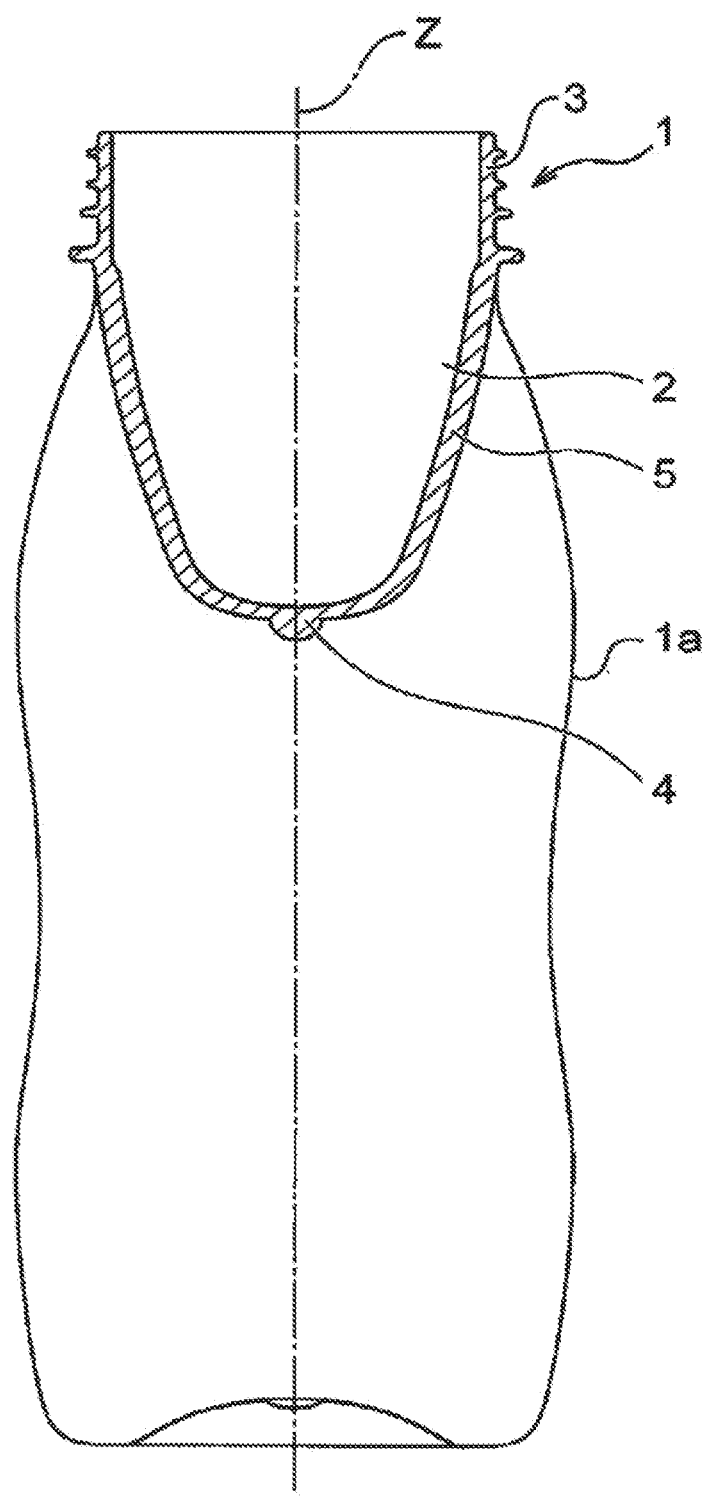
FIG. 5 is a cross-sectional view of the preform blow-molded by the blow molding part.

FIG. 1 is a perspective view of a blow molding device (including injection molding part, temperature adjustment part, blow molding part, and take-out part) according to an embodiment of the present invention, FIG. 2 is an enlarged cross-sectional view of an preform injection molded by the injection molding part as viewed from the front, FIG. 3 is a cross-sectional view of the temperature adjustment part as viewed from the front, FIG. 4 is an enlarged cross-sectional view of the preform whose temperature has been adjusted by the temperature adjustment part as viewed from the front, and FIG. 5 is a cross-sectional view of the preform blow-molded by the blow molding part.

As illustrated in FIG. 1, the blow molding device 100 includes an injection molding part 10, a temperature adjustment part 20, a blow molding part 30, and a take-out part 40, and is a device that injection-molds the preform 1 and then manufactures a blow-molded container 1a.

The injection molding part 10, the temperature adjustment part (mold unit) 20, the blow molding part 30, and the take-out part 40 are arranged so as to form four sides of a square when viewed from above. Above these, there is a turntable (not illustrated) provided with a neck mold 50 (see FIG. 3) that holds the neck portion 3 (see FIG. 2) of the preform 1 molded in injection molding part 10. This turntable has four sets of neck molds 50 arranged in an array that forms four sides of a square when viewed from above. As a result, by rotating the turntable 90° counterclockwise around a vertical axis on injection molding part 10, the temperature adjustment part 20, the blow molding part 30, and the take-out part 40, each of the four sets of neck molds 50 moves to the injection molding part 10, the temperature adjustment part 20, the blow molding part 30, and the take-out part 40 in order, and thus, each process is performed on the preform 1 held in the neck mold 50.

The injection molding part 10 includes an injection core mold 11, an injection cavity mold 12, and an injection device (not illustrated), and is provided for injection molding of the preform 1.

As illustrated in FIG. 2, the preform 1 is formed in a bottomed shape having the neck portion 3 on an open side and the main body portion 2 on a closed side. The preform 1 becomes a container 1a (see FIG. 5) by being blow-molded, and has a shape as if the blow-molded container 1a has a shape that is thickened by being shrunk in vertical and horizontal directions in the drawing. Note that the main body portion 2 is constituted by a body portion 2a that is connected to the neck portion 3 on the open side and a bottom portion 2b that is located on the closed side and connected to the body portion 2a.

When injection molding the preform 1, the injection core mold 11, the injection cavity mold 12, and the neck mold 50 are combined to define a space corresponding to the preform 1. In this case, the injection core mold 11 molds an inner surface shapes of the main body portion 2 and the neck portion 3 of the preform 1, the injection cavity mold 12 molds an outer surface shape of the main body portion 2, and the neck mold 50 molds an outer surface shape of the neck portion 3.

In the injection molding part 10, the preform 1 is designed to be molded by heating and melting a material such as a synthetic resin, which is a polyester resin such as polyethylene terephthalate (PET), at a high temperature, injecting the melted material between the injection core mold 11 and the injection cavity mold 12 and the neck mold 50 by an injection device (not illustrated), and cooling and hardening the injected material to a temperature lower than a melting point of about 255° C. Note that in order to shorten a molding cycle time, a cooling time is set to ⅔ or less, preferably ½ or less, more preferably ⅓ or less of the injection time, which is shorter than before.

The injection core mold 11 is formed so that a transverse cross section or a diameter of a portion corresponding to the main body portion 2 of the preform 1 is smaller than a transverse cross section or a diameter of a portion corresponding to the neck portion 3. As a result, an inner side of the injection-molded preform 1 is formed to have a smaller internal space area in a direction perpendicular to an axial center Z of the preform 1 in the main body portion 2 than in the neck portion 3.

In addition, the injection core mold 11 is formed so that the transverse cross section gradually decreases as it approaches a position on a mold surface corresponding to the bottom portion of the preform 1. As a result, the inner side of the injection-molded preform 1 is formed so that the internal space area extending in the direction perpendicular to the axial center Z of the preform 1 gradually decreases as it approaches the bottom portion of the preform 1.

The preform 1, which has hardened to some extent after being injection-molded by the injection molding part 10, is lifted upward together with the turntable while being held by the neck mold 50, and is released from the injection core mold 11 and the injection cavity mold 12. As illustrated in FIG. 1, the turntable is transported to the temperature adjustment part 20 by rotating 90° counterclockwise. Due to the short cooling time, the preform 1 is released by injection molding part 10 at a higher temperature state (in a state in which a residual heat amount is high) than before.

The temperature adjustment part 20 is located adjacent to the injection molding part 10 and includes a conditioning core mold 21 and a conditioning cavity mold 22 as illustrated in FIG. 3.

The preform 1 transported from the injection molding part 10 is lowered together with the turntable until the neck mold 50 abuts on the centering ring 60 attached to the conditioning cavity mold 22, and is inserted into the conditioning cavity mold 22. When the preform 1 is inserted into the conditioning cavity mold 22, the conditioning core mold 21 is inserted into the preform 1 through an opening formed in the neck portion 3 of the preform 1. Note that after the conditioning core mold 21 is inserted into the preform 1, the preform 1 may be inserted into the conditioning cavity mold 22 together with the conditioning core mold 21.

The conditioning core mold 21 and the conditioning cavity mold 22 are cooled (temperature adjusted) to 60° C. or higher and 80° C. or lower due to a flow of a refrigerant (temperature adjusting medium) in a flow path formed therein. Since the temperature of the preform 1 transported to the temperature adjustment part 20 is too high for blow molding, the preform 1 is positively (forcedly) cooled by being sandwiched between the cooled conditioning core mold 21 and the cooled conditioning cavity mold 22, and thus, the temperature of the preform 1 is adjusted to a temperature suitable for the blow molding.

The conditioning core mold 21 has a constricted portion 23a formed so as not to come into contact with the neck portion 3 when the conditioning core mold 21 is inserted into the conditioning cavity mold 22.

The conditioning core mold 21 is formed to be substantially the same as or one size larger than the injection core mold 11 of the injection molding part 10, and the mold surface of the conditioning core mold 21 that presses the preform 1 is formed to be substantially the same as or larger than the mold surface of the injection core mold 11 that forms the preform 1 of the injection molding part 10.

Further, the conditioning core mold 21 according to the first embodiment has a tapered shape having a smaller angle than the injection core mold 11 formed in the tapered shape of the injection molding part 10. As a result, the preform 1 can be compression-deformed from the injection molding part 10 to a shape that is easy to remove to a desired shape that is easy to blow mold. Here, the tapered shape is not limited to a conical shape, but includes a cone-like shape having any other cross-sectional shape such as a pyramid. Note that the tapered shape of the conditioning core mold 21 and the injection core mold 11 may be the same, or the tapered shape of the conditioning core mold 21 may be larger than the tapered shape of the injection core mold 11. Further, the external shape of the conditioning core mold 21 may not have a tapered shape, and may have other curved shapes such as a quadratic curved shape in which an inclination increases from a lower end to an upper end and a quadratic curved shape in which an inclination decreases from a lower end to an upper end. Note that the shape of the preform that is easy to remove means a shape that is easy to release from the injection core mold 11 and is unlikely to be rolled up and deformed at the time of release. For example, at the initial stage of the mold release, the shape of the preform means a shape in which air flowing into a gap between the inner surface of the body portion 2a of the preform 1 and the outer surface of the injection core mold 11 is easily guided to the side of the bottom portion 2b, and the bottom portion 2b and the injection core mold 11 are easily separated from each other. For example, a tapered shape in which the inner surface of the body portion 2b of the preform 1 is inclined by 5° or more and 45° or less toward the central axis side of the preform 1 or a substantially quadratic curve (substantially parabolic) shape is preferable. In addition, the shape of the preform that is easy to blow mold is a shape that has a wall thickness distribution and a stretch ratio suitable for giving good physical properties (high rigidity and top load) or appearance to the blow-molded containers.

Like the conditioning core mold 21, the conditioning cavity mold 22 is also formed to be substantially the same as or one size larger than the injection cavity mold 12 of the injection molding part 10, and the mold surface pressed by the preform 1 of the conditioning cavity mold 22 is formed to be substantially the same as or larger than the mold surface forming the preform 1 of the injection cavity mold 12 of the injection molding part 10. To enhance the effect of the temperature control (cooling), a mold formed by combining the conditioning core mold 21 and the conditioning cavity mold 22 is preferably formed to be larger than a mold in which the injection core mold 11 and the injection cavity mold 12 of the injection molding part 10 are combined. As a result, the preform 1 whose temperature has been adjusted and shape is modified by the temperature adjustment part 20 becomes one size larger than the preform 1 whose temperature is not adjusted and shape is not modified. Note that it is preferable that the conditioning cavity mold has a single digging type structure rather than a split type like the neck mold 50.

As illustrated in FIG. 4, the temperature adjustment part 20 is provided so that the conditioning core mold 21 is in contact with substantially the entire inner surface of the main body portion 2 of the preform 1, and the conditioning cavity mold 22 is in contact with substantially the entire outer surface of the main body portion 2 of the preform 1, and modifies the shape of the preform 1 with the main body portion 2 of the preform 1 sandwiched between the conditioning core mold 21 and the conditioning cavity mold 22. In FIG. 4, the preform 1 before being enlarged by the compression deformation (pressing deformation) by the temperature adjustment part 20 is illustrated by a chain double-dashed line, and the compression-deformed preform 1 is illustrated by a solid line. By sandwiching the preform 1 between the conditioning core mold 21 and the conditioning cavity mold 22 while applying pressure to the preform 1 and cooling the preform 1, the temperature adjustment part 20 is formed to adjust the temperature (cooling) at the same time the inside and the outside of the preform 1 while compressing and deforming from the primary shape preform 1 at the time of the injection molding to the secondary shape preform 1 suitable for the blow molding to the final container 1a. In this case, the cylindrical gate 4 formed in the bottom portion of the preform 1 is also crushed and compressed and deformed into a hemispherical shape. Since the temperature of the preform 1 at the time of temperature adjustment is higher than that at the time of the blow molding, the gate 4 is easier to crush at the time of the temperature adjustment than at the time of the blow molding.

When the PET material is slowly cooled in a temperature range of about 120° C. to 200° C., crystallization progresses and whitening or cloudiness occurs. Therefore, in order to manufacture the container 1a (see FIG. 5) having high transparency, it is necessary to rapidly cool the injection-molded preform 1 to a temperature range below the temperature range in which the injection-molded preform 1 injection-molded by the injection molding part 10 can be easily crystallized. In this case, in the case of the preform 1 having the thick wall portion 5, it was conventionally difficult to sufficiently cool the center of the wall portion 5, but the temperature control part 20 according to the first embodiment is made to closely press the inside and outside of the body part 2 of the preform 1 on the entire surface of the preform with the conditioning core mold 21 and the conditioning cavity mold 22. As a result, even if the wall portion 5 of the preform 1 is thick, the wall portion 5 is compressed and deformed (to press the wall portion 5 to make the wall portion 5 thinner), thereby greatly improving the removal of the temperature deviation, the temperature equalization, and the efficiency of cooling. Further, since the temperature distribution is suitable for the blow molding as a whole, it is possible to prevent the wall thickness of the container 1a, which is the final form, from being unevenly distributed. Furthermore, even when the molding cycle time is short (when the cooling time of the injection molding process is short and the preform 1 is released at a high temperature), the whitening (crystallization) of the preform 1 and the container 1b due to slow cooling should be suppressed well.

In addition, in the temperature adjustment part 20, when viewed in cross section, the mold surface of the entire outer circumference of the conditioning core mold 21 is pressed in contact with the inner surface of the main body portion 2 of the preform 1, and the mold surface of the entire inner circumference of the conditioning cavity mold 22 is pressed in contact with the outer surface of the main body portion 2 of the preform 1. As a result, even when the preform 1 having a shape having corners is manufactured, the corners are also compressed and deformed together with the other portions, so the temperature of the corners can be adjusted evenly.

The preform 1 whose temperature has been adjusted by the temperature adjustment part 20 is lifted upward with the turntable while being held in the neck mold 50 and is pulled out from the conditioning cavity mold 22, and as illustrated in FIG. 1, the turntable further rotates 90° counterclockwise and transported to the blow molding part 30.

As illustrated in FIG. 1, the blow molding part 30 is arranged next to the temperature adjustment part 20 and has a blow mold 31 and an air blowing part (not illustrated).

The blow mold 31 has a mold surface corresponding to the shape of the container 1a formed on the inner side, which is considerably larger than the conditioning cavity mold 22 of the temperature adjustment part 20. The blow mold 31 is constituted by a pair of blow split molds that can be opened and closed in the horizontal direction and a bottom mold that can be moved in the vertical direction.

The air blowing part is provided so as to fill the preform 1 inserted in the blow mold 31 with air.

When the preform 1 transported to the blow molding part 30 is lowered together with the turntable and inserted into the blow mold 31, the air blowing part is connected to the opening of the neck portion 3 of the preform 1, and the air blowing part blows air into the preform 1, as illustrated in FIG. 5, the main body portion 2 of the preform 1 is inflated until the entire outer surface of the main body portion 2 is pressed against the mold surface of the blow mold 31, so the container 1a is molded.

The preform 1 blow-molded by the blow molding part 30 is lifted upward with the turntable while being held by the neck mold 50 and is pulled out from the blow mold 31, and as illustrated in FIG. 1, the turntable further rotates 90° counterclockwise and transported to the take-out part 40.

As illustrated in FIG. 1, the take-out part 40 is disposed between the blow molding part 30 and the injection molding part 10. In the take-out part 40, the neck mold 50 opens and does not hold the container 1a, so that the container 1a falls and the container 1a is taken out from the blow molding device 100.

Hereinafter, the case where the shape of the preform 1 hardly changes before and after the temperature adjustment and the case where the shape of the preform 1 changes before and after the temperature adjustment will be described.

Figure 6A:
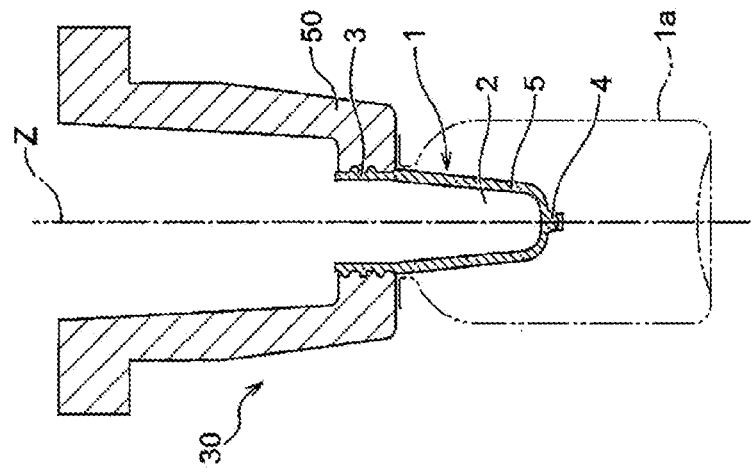
FIGS. 6A to 6C are cross-sectional views illustrating a state in which a shape of the preform hardly changes before and after the temperature adjustment in the temperature adjustment part.
Figure 6B:
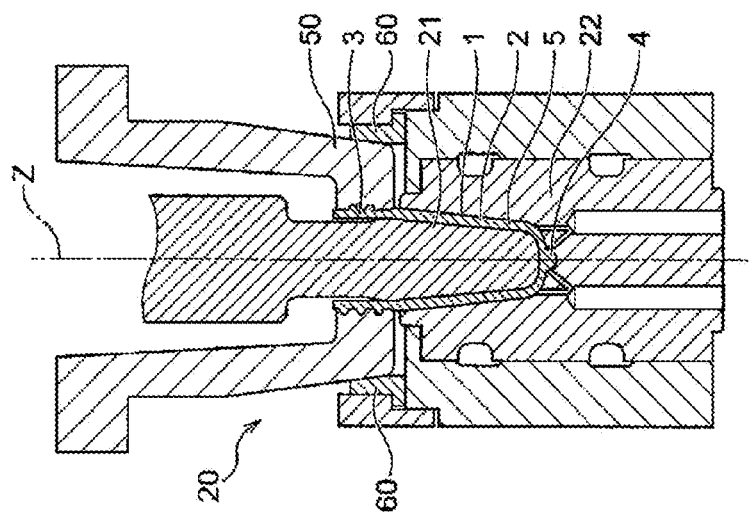
Figure 6C:
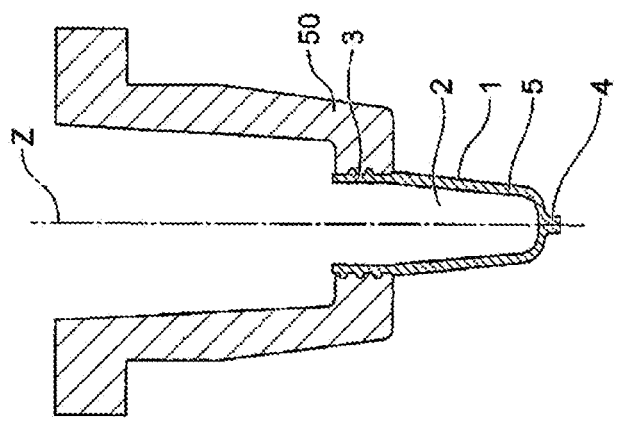

FIGS. 6A to 6C illustrate cross-sectional views of a state in which the shape of the preform hardly changes before and after the temperature adjustment. In FIGS. 6A to 6C, FIG. 6A illustrates how the neck mold transports the injection-molded preform, FIG. 6B illustrates how the temperature is adjusted by the temperature adjustment part, and FIG. 6C illustrates how the temperature-controlled preform is blow-molded. The preform 1 used in FIGS. 6A to 6C is longer than the preform used in FIGS. 2 to 5.

First, the injection-molded preform 1 is held in the neck mold 50 and transported to the temperature adjustment part 20, as illustrated in FIG. 6A. In this case, the preform 1 is slightly shrunk as the temperature drops.

As illustrated in FIG. 6B, the shrunk preform 1 is subjected to temperature adjustment (cooling) and compression deformation by the temperature adjustment part 20. In this case, the preform is sandwiched between the conditioning core mold 21 and the conditioning cavity mold 22 and compressed and deformed, and the preform 1 is modified to the same shape as before shrinking due to the temperature drop, that is, immediately after injection-molded. The conditioning core mold 21 illustrated in FIG. 6A is formed to have substantially the same size as the injection core mold 11 of the injection molding part 10, and the mold surface of conditioning core mold 21 has substantially the same surface area as the mold surface of injection core mold 11. The mold surface of the conditioning cavity mold 22 is also formed to be substantially the same size as the injection cavity mold 21.

The preform 1 whose temperature has been adjusted is transported to the blow molding part 30 by the neck mold 50 and blow-molded as illustrated in FIG. 6C to become the final product, the container 1a. In FIG. 6C, the preform 1 before the blow molding is shown by a solid line, and the blow-molded container 1a is shown by a chain double-dashed line.

Figure 7A:
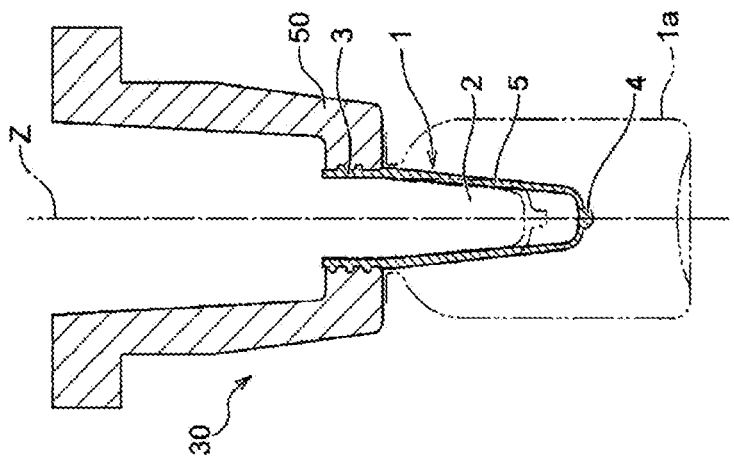
FIGS. 7A to 7C are cross-sectional views illustrating a state in which the shape of the preform changes before and after the temperature adjustment in the temperature adjustment part.
Figure 7B:
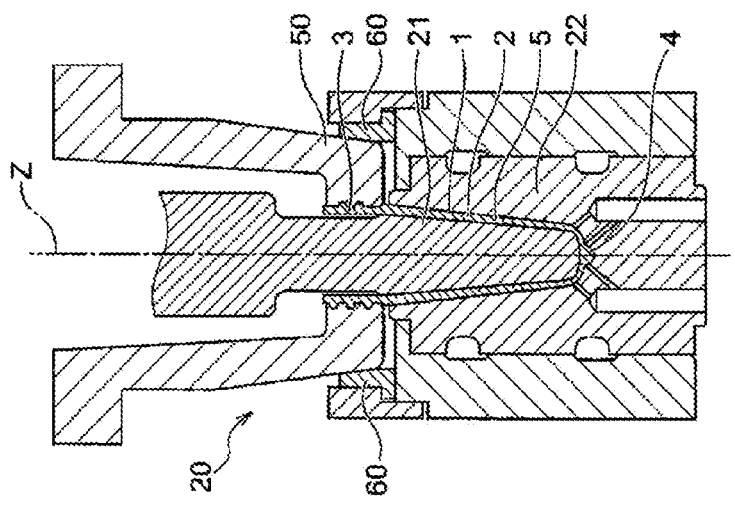
Figure 7C:
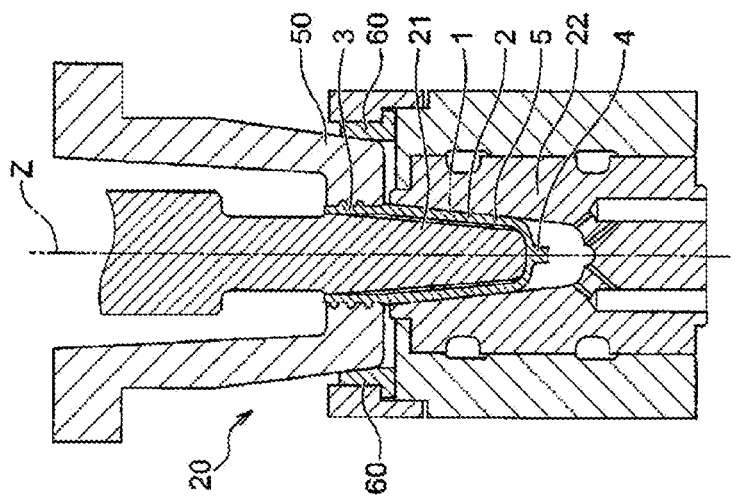

FIGS. 7A to 7C illustrate cross-sectional views of a state in which the shape of the preform changes before and after the temperature adjustment. In FIGS. 7A to 7C, FIG. 7A illustrates how the conditioning core mold reaches the bottom portion of the preform inserted into the temperature adjustment part, FIG. 7B illustrates how the conditioning core mold reaches the bottom portion of the conditioning cavity mold, and FIG. 7C illustrates how the preform whose temperature has been adjusted is blow-molded. Note that the preform 1 used in FIGS. 7A to 7C is the same as the preform 1 used in FIGS. 6A to 6C. The conditioning core mold 21 illustrated in FIG. 7B is formed to be larger than the size of the injection core mold 11 of the injection molding part 10, and the mold surface of the conditioning core mold 21 has a larger surface area than the mold surface of the injection core mold 11. The mold surface of the conditioning cavity mold 22 is also formed larger than the injection cavity mold 21.

The injection-molded preform 1 is held in the neck mold 50 and transported to the temperature adjustment part 20 as in the case illustrated in FIG. 6A.

As illustrated in FIG. 7A, the conditioning core mold 21 is inserted into the preform 1 inserted into the conditioning cavity mold 22 by the neck mold 50. Since the mold surface of the conditioning cavity mold 22 illustrated in FIG. 7(a) is formed deeper than the length of the preform 1, the conditioning core mold 21 that has reached the bottom portion of preform 1 is further lowered toward the conditioning cavity mold 22. As a result, the preform 1 is stretched by the conditioning core mold 21 until the preform 1 reaches the bottom portion of the conditioning cavity mold 22, as illustrated in FIG. 7B. The preform 1 inserted into the conditioning cavity mold 22 is stretched to the bottom portion of the conditioning cavity mold 22, and then sandwiched between the conditioning core mold 21 and the conditioning cavity mold 22 and compressed and deformed, so the preform 1 is modified to have a longer shape than before temperature adjustment.

As illustrated in FIG. 7C, the preform 1 whose temperature has been adjusted is transported to the blow molding part 30 by the neck mold 50 and blow-molded to become the final product, the container 1a. In FIG. 7A, the preform 1 before blow molding stretched by temperature adjustment part 20 is shown by a solid line, and the preform 1 whose temperature is not adjusted and the blow-molded container 1a are shown by a chain double-dashed line.

The temperature adjustment part 20 of the blow molding device 100 according to the first embodiment is capable of adjusting the depth of the mold surface of the conditioning cavity mold 22 and the amount of the conditioning core mold 21 inserted into the conditioning cavity mold 22. The depth adjustment in the temperature adjustment part 20 will be described below.

Figure 8:
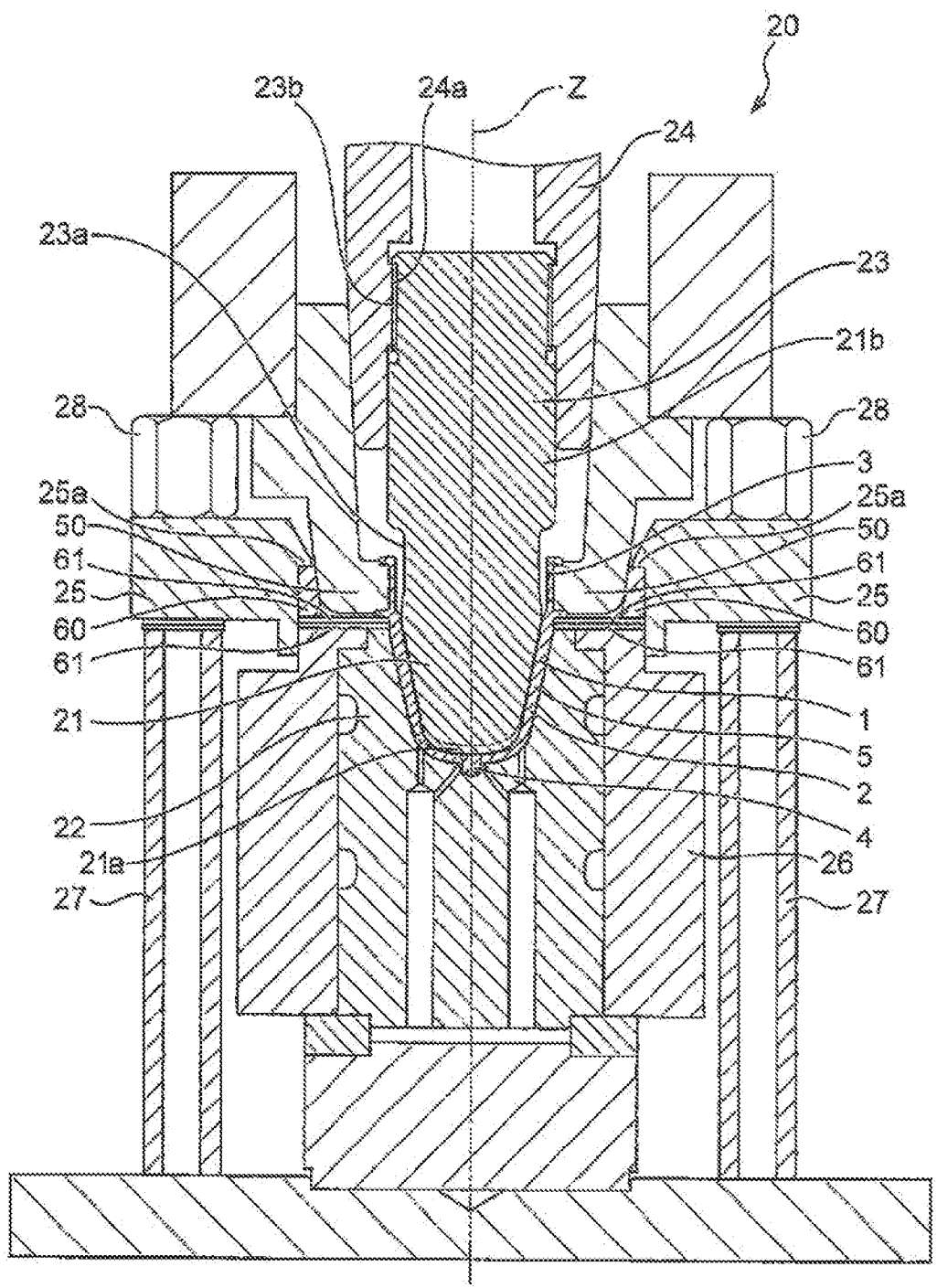
FIG. 8 is a front view of the temperature adjustment part in which two spacers are sandwiched in a conditioning cavity mold.
Figure 9:
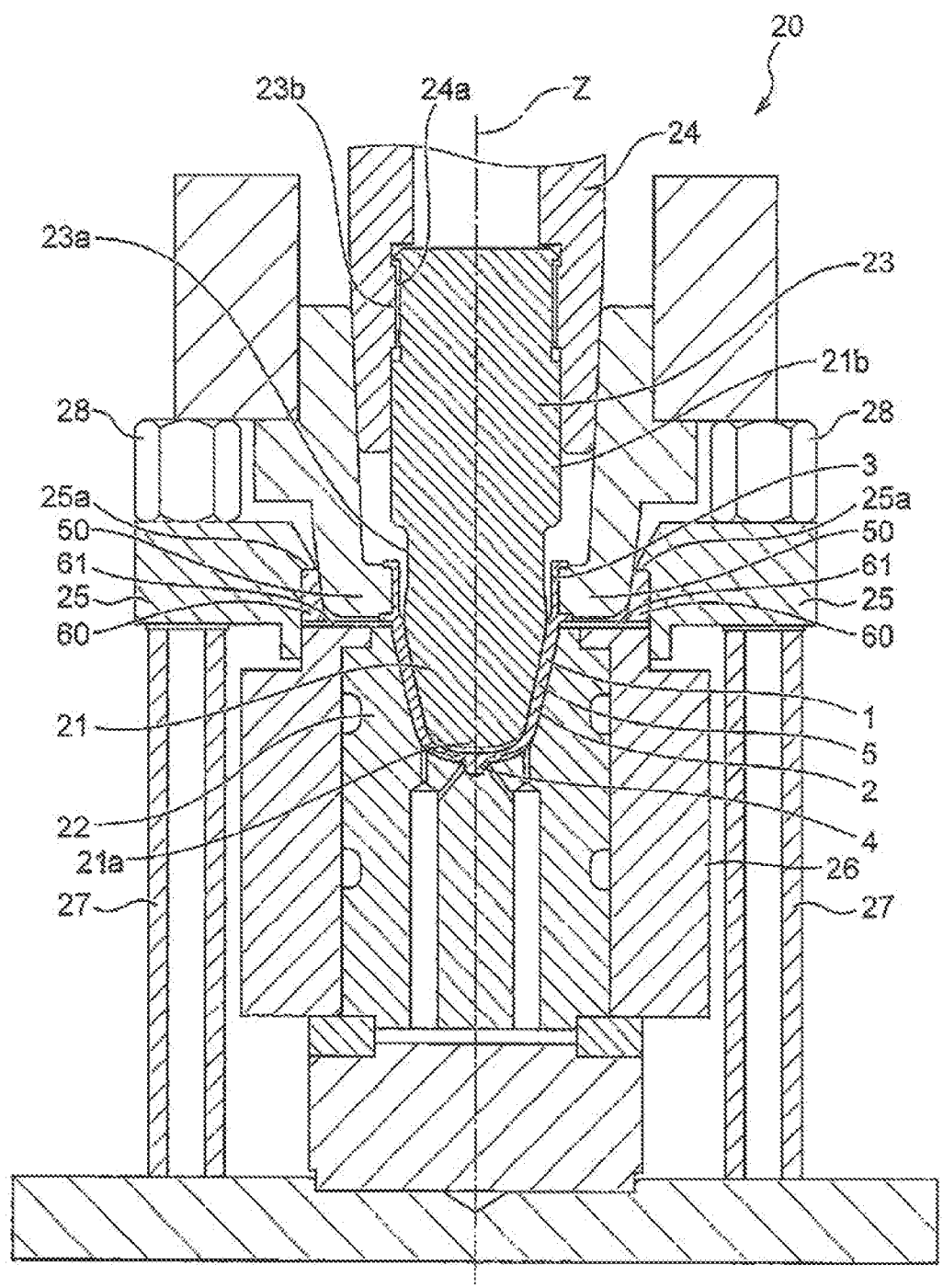
FIG. 9 is a front view in which one spacer is removed from the temperature adjustment part in FIG. 8.

FIG. 8 illustrates a front view of the temperature adjustment part in which two spacers are sandwiched on the upper surface of the conditioning cavity mold, and FIG. 9 illustrates a front view of the temperature adjustment part of FIG. 8 with one spacer removed.

As illustrated in FIG. 8, the conditioning core mold 21 includes a conditioning core mold main body 23 and a conditioning core mold support portion 24 that supports the conditioning core mold main body 23.

The conditioning core mold support portion 24 has an opening at the lower end, is formed in a tubular shape extending in the vertical direction, is fixed to a frame (not shown) that moves up and down, and has a female screw portion 24a formed in the opening.

The conditioning core mold main body 23 is formed in a columnar shape extending in the vertical direction, and has a male screw 23b formed at the upper end thereof. The conditioning core mold main body 23 is inserted into the opening of the conditioning core mold support portion 24 from below, and the male screw portion 23b is screwed into the female screw portion 24a of the conditioning core mold support portion 24. As a result, the conditioning core mold main body 23 is provided so that the vertical position, that is, the depth of insertion into the conditioning cavity mold 22 can be adjusted according to the amount screwed into the conditioning core mold support portion 24. Note that in this embodiment, the conditioning core mold main body 23 is raised by 1.5 mm each time it is screwed in one turn.

A centering ring 60 is incorporated into the upper part of the conditioning cavity mold 22. This centering ring 60 is formed so that the conditioning core mold main body 23 can penetrate in the vertical direction. The inner peripheral surface of this centering ring 60 has a shape in which the upper side expands in a tapered shape, the opening at the upper end has a diameter sufficient for the lower end of the neck mold 50 to pass through, and the opening at the lower end has a diameter that does not allow the lower end of the neck mold 50 to pass through. On the other hand, the lower end of the neck mold 50 is provided with the ends and corners that are located on the same circumference and in the same vertical direction around the axial center Z of the fixed preform 1. As a result, the neck mold 50 inserted into the conditioning cavity mold 22 enters the conditioning cavity mold 22 while the lower end of the neck mold 50 is guided by the inner peripheral surface of the centering ring 60. Therefore, when an axial center Z1 of the centering ring 60 matches an axial center Z2 of the conditioning cavity mold 22, the preform 1 held by the neck mold 50 is inserted into the conditioning cavity mold 22 in a state in which the axial center Z matches the axial center Z2 of the conditioning cavity mold 22.

Spacers 61 and 61 are incorporated between the conditioning cavity mold 22 and the centering ring 60. These spacers 61 and 61 are plates having a donut-shaped shape, and when the spacers 61 and 61 are arranged on the conditioning cavity mold 22 because the inner peripheral surface is formed with an opening cross section substantially the same as the upper end of the mold surface of the conditioning cavity mold 22, the inner peripheral surface is formed so as to be a surface continuous with the mold surface of the conditioning cavity mold 22. As a result, the vicinity of the neck portion 3 of the preform 1 whose temperature has been adjusted in the spacers 61 and 61 and the conditioning cavity mold 22 has a smooth shape with no steps.

The conditioning cavity mold 22 has a configuration in which the fixing portion 25 is provided so as to be movable in the vertical direction with respect to the conditioning cavity mold main body 26, and the fixing portion 25 is slidably attached up and down with a plurality of bolts 27 disposed at the outer edge of the conditioning cavity mold 22 penetrating through a hole (not illustrated). As a result, the fixing portion 25 moves toward the conditioning cavity mold main body 26 by tightening the nut 28 screwed to the upper end of the bolt 27. In the fixing portion 25, a claw 25a is formed on the inner peripheral surface, and when moving toward the conditioning cavity mold main body 26, the claw 25a is caught by the centering ring 60 and presses downward. As a result, the centering ring 60 and the spacers 61 and 61 are sandwiched and fixed between the claw 25a of the fixing portion 25 and the conditioning cavity mold main body 26 when the nut 28 is tightened. That is, the conditioning cavity mold 22 is provided so that the gap between the neck mold 50 and the conditioning cavity mold 22 can be expanded by loosening the nut 28, and the spacers 61 and 61 can be taken in and out with the gap expanded, and the gap between neck mold 50 and conditioning cavity mold 22 can be extended by sandwiching the spacers 61 and 61 between the neck mold 50 and the centering ring 60 and the conditioning cavity mold main body 26.

When actually used for manufacturing the container 1a, first, two spacers 61 and 61 are previously incorporated, and as illustrated in FIG. 9, one spacer 61 is pulled out according to the state of the manufactured container 1a, and as illustrated in FIG. 3, the thickness of the wall part 5 of the preform is changed by finely adjusting the length of the preform 1 before the blow molding by pulling out the two spacers 61 and 61. Thereby, the state of the manufactured container 1a can be satisfactorily adjusted. In addition, the preform 1 is allowed to be cooled during the transportation to the temperature adjustment part 20 and the residual heat amount (average temperature) decreases, but the degree of decrease depends on the temperature of the surrounding environment, for example, the temperature of the day, and the amount of shrinkage also fluctuates according to the temperature of the surrounding environment. From the above, the preform 1 can be modified to the optimum shape for the blow molding in consideration of the surrounding environment at the time of the molding.

The temperature adjustment part 20 of the blow molding device 100 according to the first embodiment includes the conditioning core mold 21 which is in contact with substantially the entire inner surface of the main body portion 2 of the preform 1 and the conditioning cavity mold 22 which is in contact with substantially the entire outer surface of the main body portion 2, and the shape of the preform 1 is modified by sandwiching the main body portion 2 between the conditioning core mold 21 and the conditioning cavity mold 22. As a result, even if the preform 1 is easily whitened or clouded by being released at a high temperature by the injection molding part 10 and has a large temperature deviation, sufficient temperature deviation removal and temperature equalization can be performed in a short time such as 3 seconds or less, so it is possible to impart a temperature distribution suitable for the blow molding. Therefore, the molding cycle time can be shortened without deteriorating the quality such as the physical properties and appearance of the molded container 1a.

Further, the temperature adjustment part 20 of the blow molding device 100 according to the first embodiment includes the conditioning core mold 21 in contact with the inner surface of the main body portion 2 of the preform 1 and the conditioning cavity mold 22 in contact with the outer surface of the main body portion 2, and when the conditioning core mold 21 is located in the conditioning cavity mold 22, a gap from the conditioning cavity mold (22, 322, 422, 522) gradually increases as an interval from the tip portion (21a) of the conditioning core mold (21, 321, 421, 521) toward the base end portion (21b) increases. As a result, air can escape without forming a slit or the like in the conditioning core mold. Therefore, the molding cycle time can be shortened without deteriorating the quality such as the physical properties and appearance of the molded container 1a.

In addition, by compressing and deforming the preform 1 in the temperature adjustment part 20, the preform 1 can be modified into a different shape before and after the temperature adjustment. That is, the injection molding part 10 does not take much consideration of the shape of the final container 1a and mold the preform 1 so that the preform 1 has a shape and a wall thickness that is highly releasable exclusively from the injection cavity mold 12, and the temperature adjustment part 20 can mold the preform 1 and adjust the temperature of the preform 1 to a shape suitable for blow molding in consideration of the shape of the final container 1a. Therefore, since the blow molding device 100 can modify the shape and adjust the temperature to be suitable for the blow molding of the container having various shapes regardless of the shape and wall thickness of the preform 1, the blow molding device 100 is highly versatile. For example, when the temperature of the preform of the container having a flat cross section such as an elliptical shape is adjusted, by making the cross section of at least one of the conditioning core mold 21 or the conditioning cavity mold 22 flat, the primary shape preform having a perfect circular cross section in the injection molding part 10 can be compressed and deformed into the secondary shape preform having the flat cross section in the temperature adjustment part 20.

Further, the blow molding device 100 according to the first embodiment does not require a major modification of the existing device, and can be implemented without much difference in energy efficiency.

Furthermore, since the temperature adjustment part 20 modifies the shape of preform 1 itself to a shape suitable for the blow molding, the blow molding device 100 according to the first embodiment makes the preform 1 easily suitable for the blow molding as compared with the case where only the temperature is adjusted without modifying the shape of the preform 1 molded by the injection molding part 10. Therefore, the operation related to setting the molding conditions for the temperature adjustment part 20 can be performed relatively easily.

Second Embodiment

Figure 11:
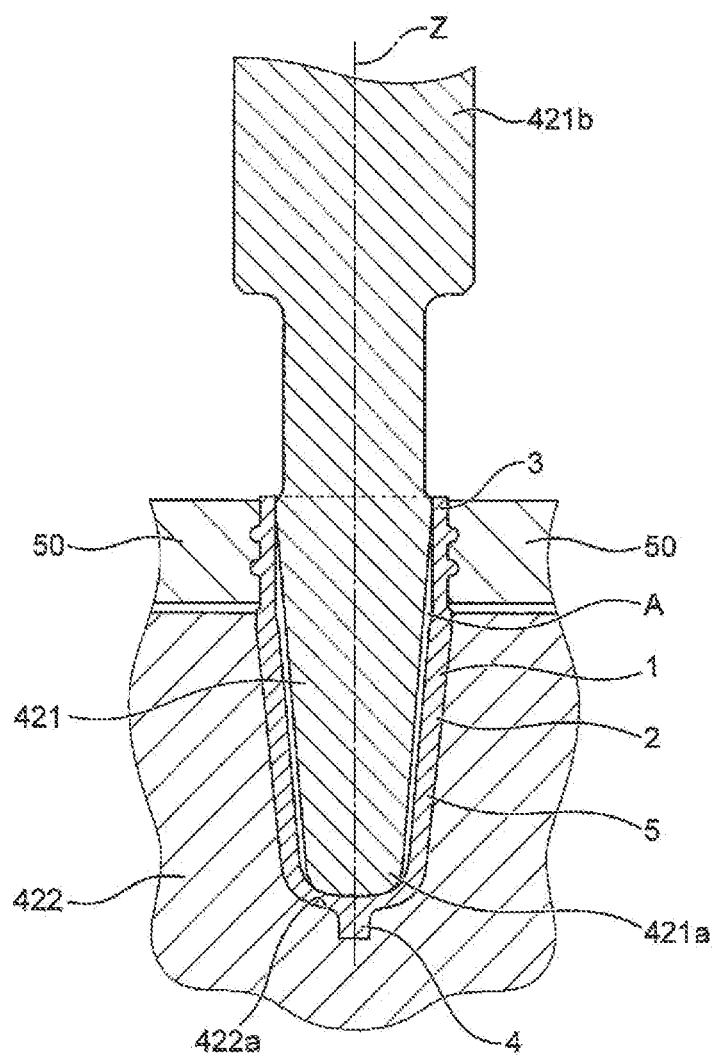
FIG. 11 is a schematic cross-sectional view of a temperature adjustment part according to a second embodiment of the present invention.

FIGS. 10A to 10C illustrate cross-sectional views of a normal temperature adjustment part, and FIG. 11 illustrates a schematic cross-sectional view of a temperature adjustment part according to a second embodiment. In the second embodiment, parts different from those of the first embodiment will be described, and the same reference numerals are used for substantially the same configurations as those of the first embodiment in the drawings.

When inserting a conditioning core mold 321 into a conditioning cavity mold, as illustrated in FIG. 10A, there is a risk that air A will be trapped between a preform 1 and the conditioning core mold 321. Further, as illustrated in FIG. 10B, when a slit 323 for allowing air to escape is formed in the conditioning core mold 321, the air can be released so as not to be trapped, but there is a risk that a trace of the slit 323 will be left on an inner side surface of the preform 1, and the trace of the slit 323 will be slightly left on a blow-molded container 1a.

As illustrated in FIG. 11, a conditioning core mold 421 according to the second embodiment is formed so that a gap between the conditioning core mold and an inner surface of a body portion 2b of the preform 1 or a conditioning cavity mold 422 increases as a gap from a bottom portion 422a of the conditioning cavity mold 422 increases. That is, the conditioning core mold 421 has a shape in which the inner surface of the body portion 2b of the preform 1 or the conditioning cavity mold 422 is gradually widened from the tip portion 421a to the base end portion 421b of the conditioning core mold 421 rather than the shape in which the inner surface or the conditioning cavity mold 422 is widened from the bottom portion. For example, a tapered angle extending from a bottom portion on an outer surface of the conditioning core mold 421 is set to be smaller than a tapered angle extending from a bottom portion on the inner surface of the body portion 2b of the preform 1 or the conditioning cavity mold 422. As a result, when inserting the conditioning core mold 421 into the preform 1 disposed in the conditioning cavity mold 422, first, the tip portion 421a of the conditioning core mold 421 sandwiches the preform 1 with the bottom portion 422a of the conditioning cavity mold 422 in a small circular area. In this state, by further inserting the conditioning core mold 421, the air A intervening between the preform 1 and the conditioning core mold 421 spreads like a donut around the circular area sandwiched between the tip portion 421a of the conditioning core mold 421 and the bottom portion 422a of the conditioning cavity mold 422. The conditioning core mold 421 is inserted into the conditioning cavity mold 422 while removing air A from an upper end of a neck portion 3. When the conditioning core mold 421 is further inserted into the conditioning cavity mold 422, the air A that intervenes in the donut shape between the preform 1 and the conditioning core mold 421 continues to spread in the donut shape with a larger diameter, and is discharged to the outside from an upper end 3a of the neck portion 3 when the conditioning core mold 421 is in close contact with substantially the entire inner surface of the main body portion 2 of the preform 1.

Third Embodiment

Figure 12A:
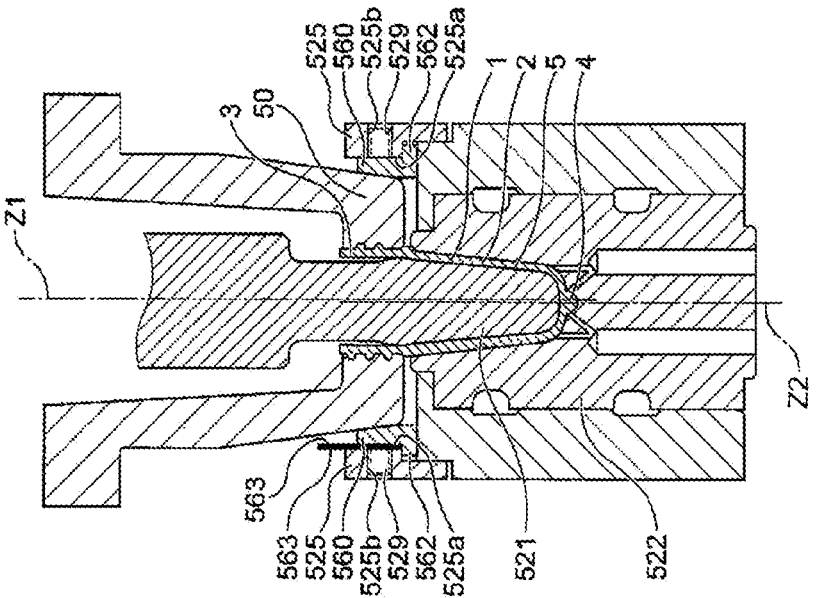
FIGS. 12A and 12B are cross-sectional views of the temperature adjustment part in which an axial center can be adjusted as viewed from the front.
Figure 12B:
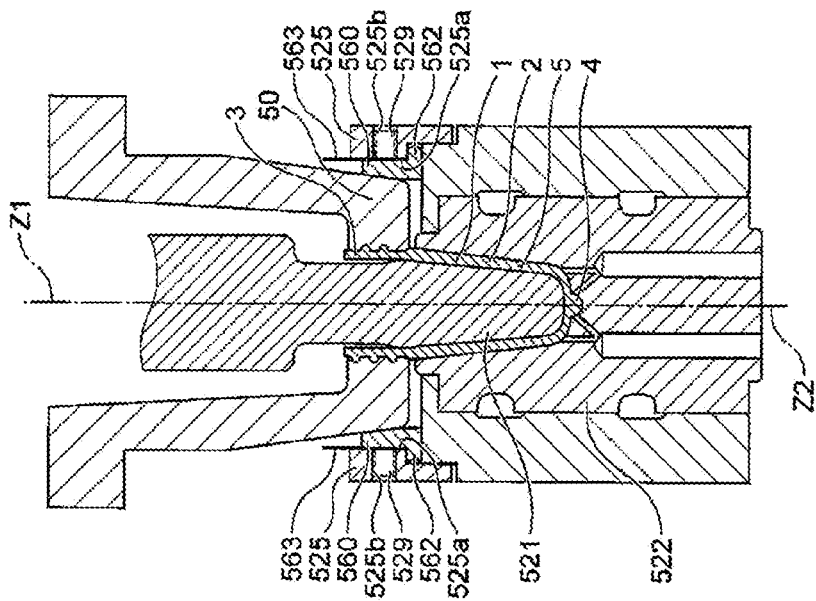
Figure 13A:
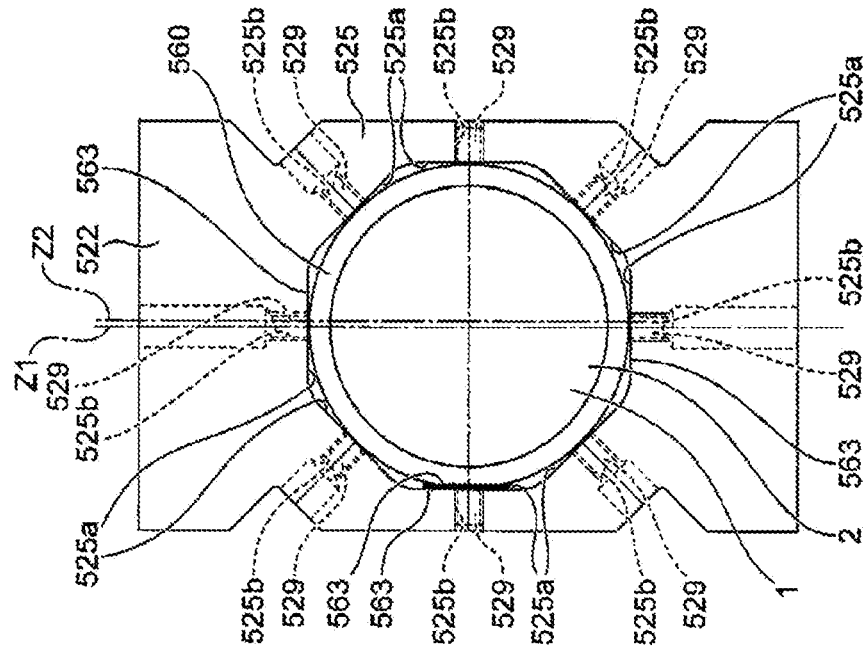
FIGS. 13A and 13B are plan views of a conditioning cavity mold with the adjustable axial center.
Figure 13B:
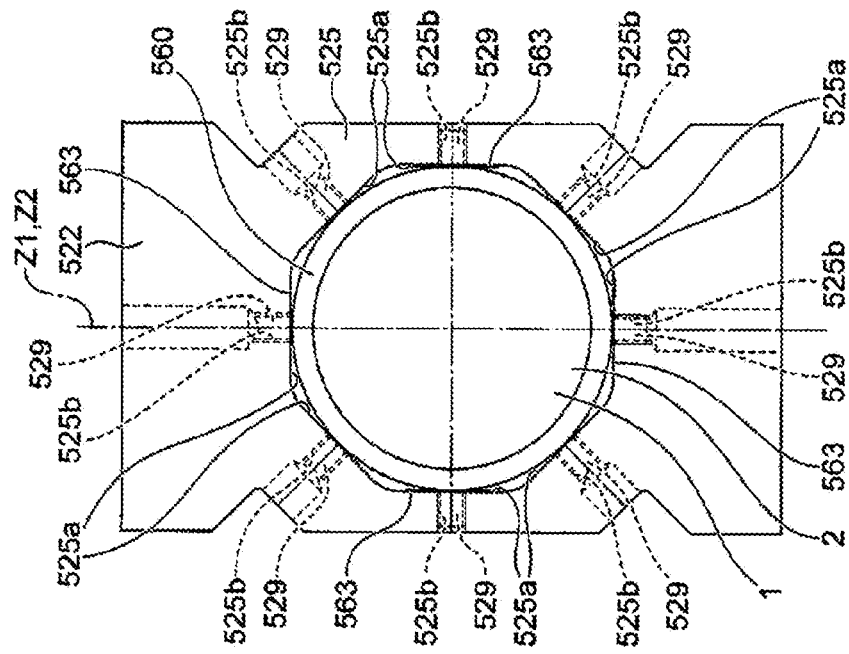

FIGS. 12A and 12B illustrate cross-sectional views of the temperature adjustment part in which an axial center can be adjusted from a front, and FIGS. 13A and 13B illustrate plan views of a conditioning cavity mold in which the axial center can be adjusted. In a third embodiment, parts different from those of the first embodiment will be described, and the same reference numerals are used for substantially the same configurations as those of the first embodiment in the drawings.

In a temperature adjustment part 520 according to the third embodiment, as illustrated in FIG. 12A, a lower end of a cylindrical centering ring 560 extends outward in a radial direction to form a flange portion 562. The temperature adjustment part 520 is provided so that the centering ring 560 is fixed by sandwiching the flange portion 562 between a fixing portion 525 and a main body portion 526.

As illustrated in FIG. 13A, the fixing portion 525 is formed with a flat portion 525a facing an outer peripheral surface of a cylindrical portion of the centering ring 560. Further, a gap is formed between the outer peripheral surface of the centering ring 560 and the flat portion 525a. As a result, the centering ring 560 can be moved and adjusted in a direction perpendicular to axial centers Z1 and Z2 by a width of the gap, and when the conditioning core mold 521 enters the conditioning cavity mold 522, the guided position differs depending on a position of the centering ring 560, so the axial center Z1 of the conditioning core mold 521 and the axial center Z2 of the conditioning cavity mold 522 can be matched or eccentric.

A flat plate-shaped shim (position adjustment member) 563 can be inserted between the flat portion 525a of the fixing portion 525 and the centering ring 560. A thickness of shim 563 is formed so that widths of a pair of gaps diagonally located based on the axial center Z1 of the centering ring 560 and widths of a plurality of shims, for example, widths of two shims 563 and 563 combined, are substantially the same length. As a result, when one shim 563 is inserted into each of the gaps diagonally located, diagonal positions of the axial center Z2 of the conditioning cavity mold 522 and the axial center Z1 of the centering ring 560 are aligned and centered.

In the fixing portion 525, screw holes (through holes) 525b extending in a horizontal direction toward the gap are formed for each gap. Each set screw (fixing portion material) 529 is incorporated into these screw holes 525b. When a set screw 529 is screwed in, it penetrates the screw hole 525b and protrudes into the gap. As a result, the shim 563 inserted into the gap is sandwiched and fixed between the set screw 529 and an outer peripheral surface of the centering ring 560.

As illustrated in FIG. 12B, when the two shims 563 and 563 are inserted into one of the gaps diagonally located and the shim 563 is not inserted into the other gap, and as illustrated in FIG. 13B, the diagonal positions of the axial center Z2 of the conditioning cavity mold 522 and the axial center Z1 of the centering ring 560 do not match, and the centering ring 560 is eccentric to the gap on the side where the shim 563 is not inserted with respect to the conditioning cavity mold 522.

In the third embodiment, three pairs of gaps are each located diagonally and are formed in which diagonal lines connecting each gaps are separated by 60°, and by inserting the shim 563 into the gap, the positional relationship between the axial center Z1 of the centering ring 560 and the axial center Z2 of the conditioning cavity mold 522 can be adjusted.

The temperature adjustment part 520 of the blow molding device 100 according to the third embodiment includes a conditioning core mold 521 in contact with an inner surface of the main body portion 2 of the preform 1 and a conditioning cavity mold 522 in contact with the outer surface of the main body portion 2, and at least one of the conditioning core mold 521 and the conditioning cavity mold 522 is provided so that the axial centers Z1 and Z2 of each other can be moved so as to be eccentric. As a result, when the preform 1 whose one side is deviated to a higher temperature than the other is injection-molded, the conditioning cavity mold 522 can be shifted with respect to the conditioning core mold 521 to adjust a wall thickness distribution of the preform 1. For this reason, by correcting a primary shape preform 1 after injection molding with temperature deviation to a secondary shape with the optimum wall thickness distribution for blow molding by the temperature adjustment part 520, it is not necessary to carefully adjust the temperature, it is possible to adjust the temperature in a short time, and it is possible to shorten the molding cycle time without deteriorating the quality of the molded container 1a.

For example, the temperature adjustment part 520 reduces the heat amount by thinning the high temperature side of preform 1 and increases the heat amount by thickening the low temperature side, and in contrast, makes a low temperature side of the preform 1 thin to reduce the heat amount and makes it difficult to extend during the blow molding and makes a high temperature side thick to increase the heat amount and makes it easy to extend during the blow molding, thereby adjusting the positional relationship according to the wall thickness and shape of the preform 1 so that the wall thickness distribution is uniform in the final container 1a.

Fourth Embodiment

Figure 14:
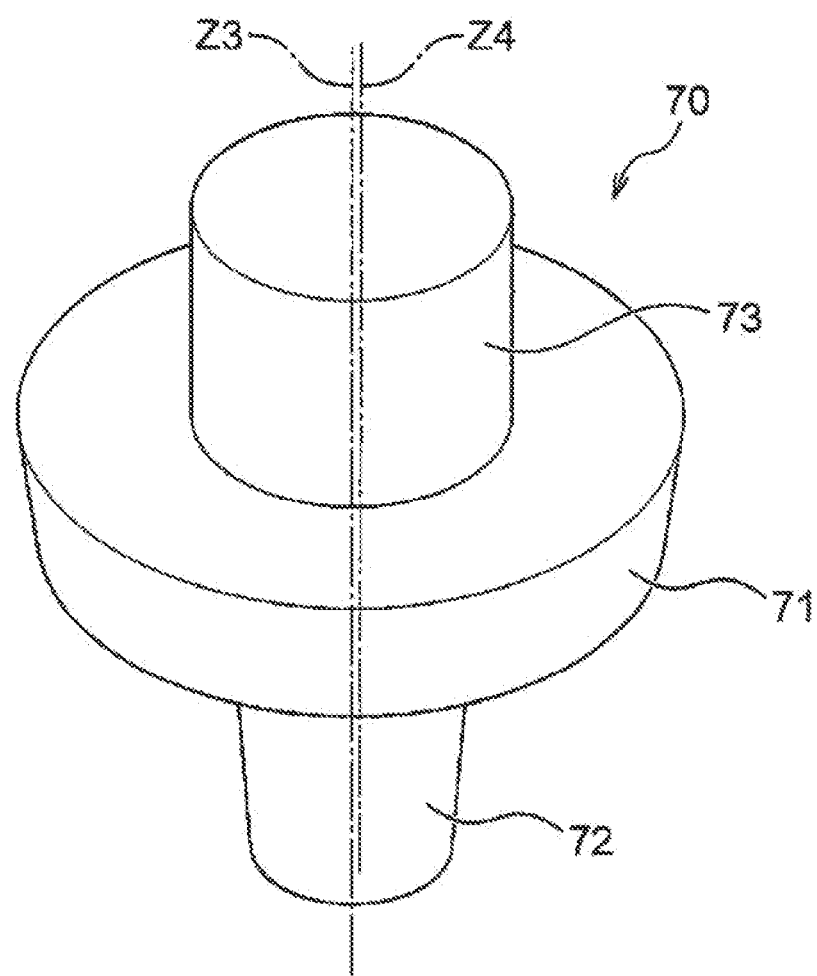
FIG. 14 is a perspective view of a jig for positioning the axial center.

FIG. 14 illustrates a perspective view of a jig for positioning an axial center, and FIGS. 15A to 15C illustrate cross-sectional views of positioning the axial center of the temperature adjustment part using the jig when viewed from a front. In a fourth embodiment, parts different from those of the third embodiment will be described, and the same reference numerals are used for substantially the same configurations as those of the first embodiment in the drawings.

As illustrated in FIG. 14, a jig 70 has a large diameter portion 71 having an outer diameter that is fitted into an inner circumference of a centering ring 560 (see FIGS. 15A to 15C), a small diameter portion 72 with an outer diameter that is fitted into the inner circumference of a conditioning cavity mold 522 (see FIGS. 15A to 15C), and a cylindrical holding portion 73 extending axially from a center of the large diameter portion 71. These large diameter portion 71 and small diameter portion 72 are not provided coaxially, and are eccentric with the axial center Z3 of the large diameter portion 71 and the axial center Z4 of the small diameter portion 72 displaced in parallel. The jig 70 is formed so that the small diameter portion 72 is longer in the axial center Z3 and Z4 directions than the large diameter portion 71, and the large diameter portion 71 and the small diameter portion 72 are tapered toward the tip so that the outer diameter becomes smaller. In addition, the jig 70 has a larger inclination with respect to an axial center Z3 in the large diameter portion 71 than in the small diameter portion 72. In the fourth embodiment, a method of eccentricizing the axial center Z1 of the conditioning core mold 521 and the axial center Z2 of the conditioning cavity mold 522 will be described, but the axial center Z3 of the large diameter portion 71 and the axial center Z4 of the small diameter portion 72 are coaxially arranged, so it is possible to center the axial center Z1 of the conditioning core mold 521 and the axial center Z2 of the conditioning cavity mold 522 so that the axial center Z1 of the conditioning core mold 521 and the axial center Z2 of the conditioning cavity mold 522 are not eccentric.

When adjusting the axial center position of the temperature adjustment part 520, as illustrated in FIG. 15A, first, the small diameter portion 72 of the jig 70 is inserted into a mold surface of the conditioning cavity mold 522 before attaching the conditioning core mold 521. In this case, since the small diameter portion 72 is longer in the axial direction, the large diameter portion 71 does not contact the centering ring 60. Further, since the small diameter portion 72 is formed in a tapered shape, the axial center Z4 of the small diameter portion 72 approaches the axial center Z2 of the conditioning cavity mold 522 as it is inserted into the conditioning cavity mold 522. Therefore, when the jig 70 is inserted vertically into the conditioning cavity mold 522, a lower end of the large diameter portion 71 enters an inner diameter of an upper end of the centering ring 60 by the time the large diameter portion 71 reaches the upper end of the centering ring 60.

When the small diameter portion 72 enters the conditioning cavity mold 522 to some extent, the lower end of the large diameter portion 71 enters the upper end opening of the centering ring 60. In the large diameter portion 71 that entered the centering ring 60, the tapered outer peripheral surface was guided along the tapered inner peripheral surface of the centering ring 60, and as illustrated in FIG. 15B, the jig 70 enters the conditioning cavity mold 22 and the centering ring 60 until the outer peripheral surface of the large diameter portion 71 is caught in the inner peripheral surface of the centering ring 60 and cannot proceed any further. In this case, the axial center Z3 of the large diameter portion 71 of the jig 70 and the axial center Z4 of the small diameter portion 72 are eccentric, so the axial center Z2 of the conditioning cavity mold 522 and the axial center Z1 of the centering ring 60 are eccentric.

When the alignment of the centering ring 60 with respect to the conditioning cavity mold 522 is completed, the centering ring 60 is fixed to the conditioning cavity mold 522 by tightening a nut (not illustrated), the jig 70 is pulled out from the temperature adjustment part 520, and as illustrated in FIG. 15C, the conditioning core mold 521 and the conditioning cavity mold 522 are positioned eccentrically with respect to each other.

The temperature adjustment part 520 of the blow molding device 100 according to the fourth embodiment includes a conditioning core mold 521 in contact with an inner surface of the main body portion 2 of the preform 1 and a conditioning cavity mold 522 in contact with the outer surface of the main body portion 2, and at least one of the conditioning core mold 521 and the conditioning cavity mold 522 is provided so that the axial centers Z1 and Z2 of each other can be moved so as to be eccentric. As a result, when the preform 1 whose one side is deviated to a higher temperature than the other is injection-molded, the conditioning cavity mold 522 can be shifted with respect to the conditioning core mold 521 to adjust a wall thickness distribution of the preform 1. For this reason, by correcting a primary shape preform 1 after injection molding with temperature deviation to a secondary shape with the optimum wall thickness distribution for blow molding by the temperature adjustment part 520, it is not necessary to carefully adjust the temperature, it is possible to adjust the temperature in a short time, and it is possible to shorten the molding cycle time without deteriorating the quality of the molded container 1a.

Although the present invention has been described above based on the embodiments, the present invention is not limited thereto. For example, in the above embodiment, in the injection core mold 11, the transverse cross section of the portion corresponding to the main body portion 2 is smaller than the transverse cross section of the portion corresponding to the neck portion 3, but the present invention is not limited thereto. For example, in the injection core mold, the transverse cross section of the portion corresponding to the main body portion may be the same size as the transverse cross section of the portion corresponding to the neck portion.

Further, in the above embodiment, the conditioning core mold 21 is larger than the injection core mold 11 of the injection molding part 10, but the present invention is not limited thereto. For example, the conditioning core mold may be the same size as the injection core mold of the injection molding part, and in this case, the cooled and shrunk preform after the injection molding can be returned to the size before shrinking.

The invention claimed is:

1. A blow molding device, comprising: an injection molding part injection-molding a preform having a neck portion on an open side and a main body portion on a closed side; a temperature adjustment part adjusting a temperature of the preform molded by the injection molding part; and a blow molding part blow-molding the preform whose temperature has been adjusted by the temperature adjustment part,
   wherein the temperature adjustment part include a conditioning core mold that is in contact with substantially an entire inner surface of the main body portion and a conditioning cavity mold that is in contact with substantially an entire outer surface of the main body portion, and compress and deform the main body portion of the preform into a desired shape with the main body portion sandwiched between the conditioning core mold and the conditioning cavity mold.

2. The blow molding device according to claim 1, wherein the compression deformation of the preform into the desired shape deforms the preform from a shape that is easy to remove from the injection molding part to a shape that is easy to blow mold.

3. The blow molding device according to claim 1, wherein the conditioning core mold and the conditioning cavity mold are cooled to a temperature below a predetermined temperature at which the preform is not crystallized.

4. The blow molding device according to claim 1, wherein the conditioning core mold have transverse cross section equal to or larger than that of an injection core mold of the injection molding part.

5. A blow molding device, comprising: an injection molding part injection-molding a preform having a neck portion on an open side and a main body portion on a closed side; a temperature adjustment part adjusting a temperature of the preform molded by the injection molding part; and a blow molding part blow-molding the main body portion of the preform whose temperature has been adjusted by the temperature adjustment part, wherein the temperature adjustment part includes a conditioning core mold that is in contact with an inner surface of the main body portion of the preform, and a conditioning cavity mold that is in contact with an outer surface of the main body portion, and wherein at least one of the conditioning core mold and the conditioning cavity mold is provided so that axial centers of each other are moved and adjusted eccentrically.

6. The blow molding device according to claim 5, further comprising: a neck mold holding the neck portion of the preform, wherein a centering ring for centering the conditioning core mold and the conditioning cavity mold are mounted between the neck mold and the conditioning cavity mold, and the movement adjustment of the conditioning core mold and the conditioning cavity mold is performed by moving and adjusting the centering ring.

7. The blow molding device according to claim 6, wherein the movement adjustment of the centering ring is performed by sandwiching a shim between the centering ring and the attached conditioning core mold or conditioning cavity mold.

8. The blow molding device according to claim 6, wherein the conditioning core mold and the conditioning cavity mold are eccentrically moved and adjusted with respect to each other by inserting and rotating a jig into the centering ring and the conditioning cavity mold, the jig having a large diameter portion having an outer diameter that is fitted into an inner circumference of the centering ring and a small diameter portion that has an outer diameter fitted into an inner circumference of the conditioning cavity mold and has an axial center eccentric with respect to an axial center of the large diameter portion.

9. A mold unit adjusting a temperature of a preform having a neck portion on an open side and a main body portion on a closed side, which is molded by an injection molding part, the mold unit comprising:

a conditioning core mold that is in contact with an inner surface of the main body portion of the preform, and a conditioning cavity mold that is in contact with an outer surface of the main body portion, wherein one of the conditioning core mold and the conditioning cavity mold is provided so as to be eccentrically movable with respect to the other thereof.

10. The mold unit according to claim 9, wherein a centering ring for centering the conditioning core mold and the conditioning cavity mold are mounted between a neck mold holding the neck portion and the conditioning cavity mold, and the movement adjustment of the conditioning core mold and the conditioning cavity mold is performed by moving and adjusting the centering ring.

11. The mold unit according to claim 10, wherein the movement adjustment of the centering ring is performed by sandwiching a shim between the centering ring and the attached conditioning core mold or conditioning cavity mold.

12. The mold unit according to claim 10, wherein the conditioning core mold and the conditioning cavity mold are eccentrically moved and adjusted with respect to each other by inserting and rotating a jig into the centering ring and the conditioning cavity mold, the jig having a large diameter portion having an outer diameter that is fitted into an inner circumference of the centering ring and a small diameter portion that has an outer diameter fitted into an inner circumference of the conditioning cavity mold and is eccentric with respect to an axial center of the large diameter portion.

\* \* \* \* \*